US012695501B2

(12) United States Patent
Itankar et al.

(10) Patent No.: US 12,695,501 B2
(45) Date of Patent: Jul. 28, 2026

(54) RECEIVERS FOR NON-TERRESTRIAL NETWORKS

(71) Applicant: QUALCOMM Incorporated, San Diego, CA (US)

(72) Inventors: Yogendra Umesh Itankar, Hyderabad (IN); Kapil Bhattad, Bangalore (IN); Shashidhar Vummintala, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 283 days.

(21) Appl. No.: 18/636,521

(22) Filed: Apr. 16, 2024

(65) Prior Publication Data

US 2025/0323715 A1     Oct. 16, 2025

(51) Int. Cl.
| | |
|---|---|
| *H04B 7/185* | (2006.01) |
| *H04B 1/04* | (2006.01) |
| *H04B 1/40* | (2015.01) |

(52) U.S. Cl.
CPC ................................ *H04B 7/18513* (2013.01)

(58) Field of Classification Search
None
See application file for complete search history.

(56) References Cited

U.S. PATENT DOCUMENTS

| | | | |
|---|---|---|---|
| 2005/0062622 A1* | 3/2005 | Miller ..................... | H03M 1/66 |
| | | | 341/123 |
| 2005/0063476 A1* | 3/2005 | Miller ..................... | H03M 1/66 |
| | | | 375/242 |
| 2024/0097724 A1* | 3/2024 | Rimini ................. | H04B 1/0483 |
| 2024/0222976 A1* | 7/2024 | Cai ........................... | H02J 3/16 |

FOREIGN PATENT DOCUMENTS

WO     WO-2025014578 A1 *  1/2025   ............... H04B 1/40

* cited by examiner

*Primary Examiner* — Pablo N Tran
(74) *Attorney, Agent, or Firm* — Holland & Hart LLP

(57) ABSTRACT

Some wireless communications systems provide communications between user equipments (UEs) and non-terrestrial networks (NTNs). An NTN may include one or more NTN nodes (e.g., satellites). When communicating with low Earth orbit (LEO) satellites, a signal received by a UE may exhibit a time-varying carrier frequency shift or Doppler shift. Some examples of the techniques described herein may address the effects of NTN Doppler on front end processing. Some examples of the techniques described herein may use a Doppler-dependent droop compensation filter after Doppler compensation using a rotator. In some approaches, Doppler-independent droop compensation may be performed. For example, a droop compensation filter may be designed for wider bandwidth that addresses a Doppler shift. A filter for jammer rejection may be utilized based on the Doppler shift or based on an NTN or terrestrial network (TN) scenario.

20 Claims, 12 Drawing Sheets

710

720

715

705

700

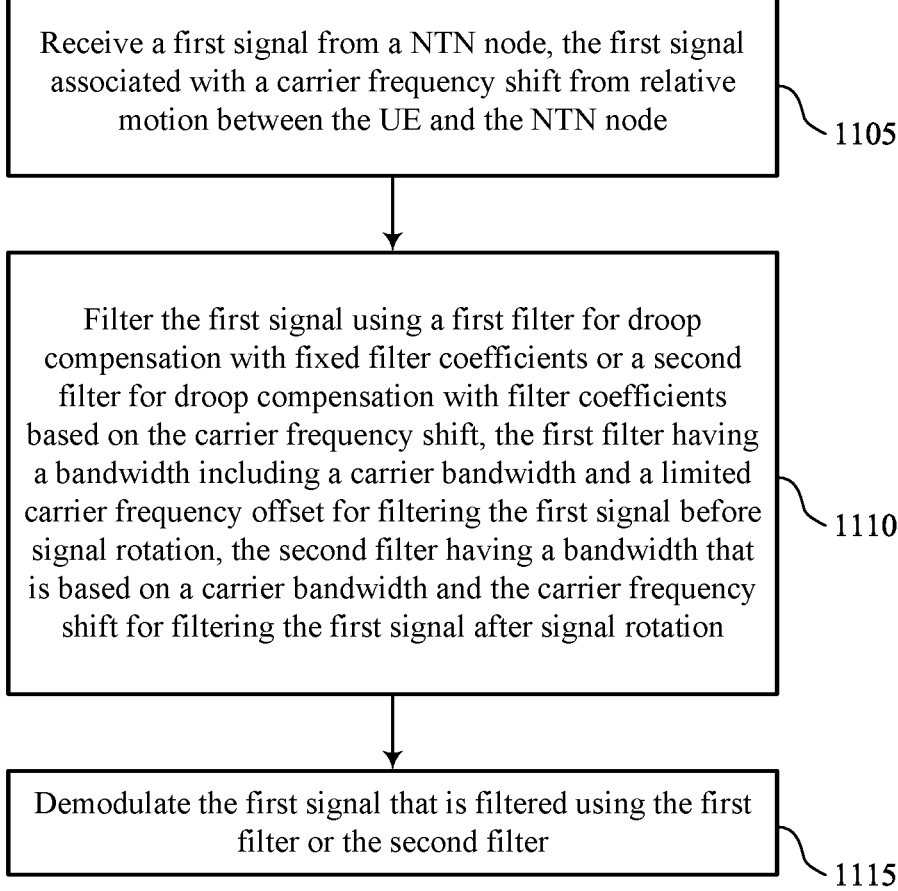

Receive a first signal from a NTN node, the first signal associated with a carrier frequency shift from relative motion between the UE and the NTN node

1105

Filter the first signal using a first filter for droop compensation with fixed filter coefficients or a second filter for droop compensation with filter coefficients based on the carrier frequency shift, the first filter having a bandwidth including a carrier bandwidth and a limited carrier frequency offset for filtering the first signal before signal rotation, the second filter having a bandwidth that is based on a carrier bandwidth and the carrier frequency shift for filtering the first signal after signal rotation

1110

Demodulate the first signal that is filtered using the first filter or the second filter

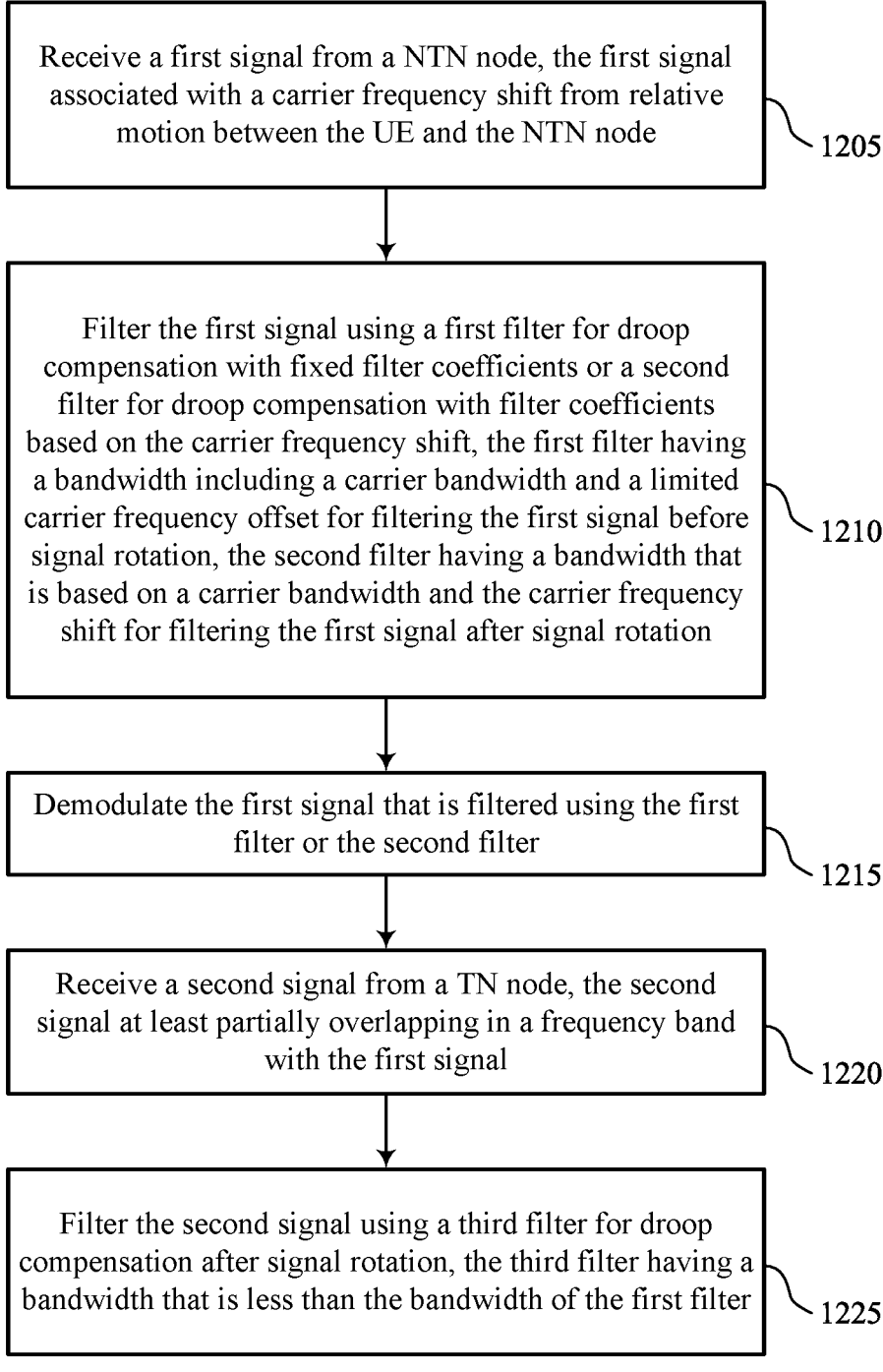

Receive a first signal from a NTN node, the first signal associated with a carrier frequency shift from relative motion between the UE and the NTN node
1205

Filter the first signal using a first filter for droop compensation with fixed filter coefficients or a second filter for droop compensation with filter coefficients based on the carrier frequency shift, the first filter having a bandwidth including a carrier bandwidth and a limited carrier frequency offset for filtering the first signal before signal rotation, the second filter having a bandwidth that is based on a carrier bandwidth and the carrier frequency shift for filtering the first signal after signal rotation
1210

Demodulate the first signal that is filtered using the first filter or the second filter
1215

Receive a second signal from a TN node, the second signal at least partially overlapping in a frequency band with the first signal
1220

Filter the second signal using a third filter for droop compensation after signal rotation, the third filter having a bandwidth that is less than the bandwidth of the first filter
1225

RECEIVERS FOR NON-TERRESTRIAL NETWORKS

FIELD OF TECHNOLOGY

The following relates to wireless communications, including receivers for non-terrestrial networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

Some wireless communications systems provide communications between user equipments (UEs) and non-terrestrial networks (NTNs). An NTN may include one or more NTN nodes (e.g., satellites). When communicating with low Earth orbit (LEO) satellites, a signal received by a UE may exhibit a time-varying carrier frequency shift or Doppler shift up to 24 parts per million (ppm). For example, satellite motion relative to a stationary UE receiver may cause a Doppler shift in NTNs. Some examples of the techniques described herein may address the effects of NTN Doppler on front end processing (e.g., digital receiver front-end (RxFE) processing). In some approaches, Doppler shift may be compensated (e.g., corrected) by an RxFE rotator, and Doppler-dependent droop compensation may be performed using a Doppler-dependent droop compensation filter. In some approaches, Doppler-independent droop compensation may be performed. For example, a droop compensation filter may be designed for wider bandwidth that addresses a Doppler shift (e.g., maximum anticipated Doppler offset).

A method for wireless communications by a UE is described. The method may include receiving a first signal from a NTN node, the first signal associated with a carrier frequency shift from relative motion between the UE and the NTN node, filtering the first signal using a first filter for droop compensation with fixed filter coefficients or a second filter for droop compensation with filter coefficients based on the carrier frequency shift, the first filter having a bandwidth including a carrier bandwidth and a limited carrier frequency offset for filtering the first signal before signal rotation, the second filter having a bandwidth that is based on a carrier bandwidth and the carrier frequency shift for filtering the first signal after signal rotation, and demodulating the first signal that is filtered using the first filter or the second filter.

A UE for wireless communications is described. The UE may include one or more memories storing processor executable code, and one or more processors coupled with the one or more memories. The one or more processors may individually or collectively be operable to execute the code to cause the UE to receive a first signal from a NTN node, the first signal associated with a carrier frequency shift from relative motion between the UE and the NTN node, filter the first signal using a first filter for droop compensation with fixed filter coefficients or a second filter for droop compensation with filter coefficients based on the carrier frequency shift, the first filter having a bandwidth including a carrier bandwidth and a limited carrier frequency offset for filtering the first signal before signal rotation, the second filter having a bandwidth that is based on a carrier bandwidth and the carrier frequency shift for filtering the first signal after signal rotation, and demodulate the first signal that is filtered using the first filter or the second filter.

Another UE for wireless communications is described. The UE may include means for receiving a first signal from a NTN node, the first signal associated with a carrier frequency shift from relative motion between the UE and the NTN node, means for filtering the first signal using a first filter for droop compensation with fixed filter coefficients or a second filter for droop compensation with filter coefficients based on the carrier frequency shift, the first filter having a bandwidth including a carrier bandwidth and a limited carrier frequency offset for filtering the first signal before signal rotation, the second filter having a bandwidth that is based on a carrier bandwidth and the carrier frequency shift for filtering the first signal after signal rotation, and means for demodulating the first signal that is filtered using the first filter or the second filter.

A non-transitory computer-readable medium storing code for wireless communications is described. The code may include instructions executable by one or more processors to receive a first signal from a NTN node, the first signal associated with a carrier frequency shift from relative motion between the UE and the NTN node, filter the first signal using a first filter for droop compensation with fixed filter coefficients or a second filter for droop compensation with filter coefficients based on the carrier frequency shift, the first filter having a bandwidth including a carrier bandwidth and a limited carrier frequency offset for filtering the first signal before signal rotation, the second filter having a bandwidth that is based on a carrier bandwidth and the carrier frequency shift for filtering the first signal after signal rotation, and demodulate the first signal that is filtered using the first filter or the second filter.

Some examples of the method, UEs, and non-transitory computer-readable medium described herein may further include operations, features, means, or instructions for compensating for the carrier frequency shift via a rotator, where the second filter may be determined based on the carrier frequency shift compensated via the rotator.

In some examples of the method, UEs, and non-transitory computer-readable medium described herein, the second filter may be determined in response to the carrier frequency shift being within a frequency range or may be determined in response to the carrier frequency shift differing by a threshold quantity from a previous carrier frequency shift.

Some examples of the method, UEs, and non-transitory computer-readable medium described herein may further include operations, features, means, or instructions for receiving a second signal from a terrestrial network (TN) node, the second signal at least partially overlapping in a frequency band with the first signal and filtering the second signal using a third filter for droop compensation after signal rotation, the third filter having a bandwidth that may be less than the bandwidth of the first filter.

In some examples of the method, UEs, and non-transitory computer-readable medium described herein, the first signal may be filtered using the first filter and the method, apparatuses, and non-transitory computer-readable medium may include further operations, features, means, or instructions for filtering the first signal using a third filter for droop compensation after signal rotation and decimation, the third filter having fixed coefficients based on a frequency response of a decimator for performing the decimation.

Some examples of the method, UEs, and non-transitory computer-readable medium described herein may further include operations, features, means, or instructions for filtering the first signal using the third filter includes filtering the first signal in a frequency domain after a frequency domain transformation or includes time domain filtering the first signal.

In some examples of the method, UEs, and non-transitory computer-readable medium described herein, the first signal may be received during an initial acquisition period before determining the carrier frequency shift and the method, apparatuses, and non-transitory computer-readable medium may include further operations, features, means, or instructions for receiving a second signal from the NTN node and compensating for the carrier frequency shift in the second signal using a local oscillator after the initial acquisition period based on determining the carrier frequency shift.

Some examples of the method, UEs, and non-transitory computer-readable medium described herein may further include operations, features, means, or instructions for receiving a second signal from the NTN node, the second signal associated with a second carrier frequency shift, detecting a jamming signal from a TN node, where the second carrier frequency shift reduces a frequency domain spacing between the first signal and the jamming signal, and filtering the second signal using a third filter for suppressing the jamming signal, the third filter having a steeper frequency response than the first filter or the second filter between the second signal and the jamming signal for the reduced frequency domain spacing.

Some examples of the method, UEs, and non-transitory computer-readable medium described herein may further include operations, features, means, or instructions for receiving a second signal from the NTN node, the second signal associated with a second carrier frequency shift, detecting a jamming signal from a TN node, where the second carrier frequency shift causes a reduced frequency domain spacing between the first signal and the jamming signal, and filtering the second signal using the first filter or the second filter, where the first filter or the second filter provides reduced jamming performance relative to a signal without the reduced frequency domain spacing.

BRIEF DESCRIPTION OF THE DRAWINGS

FIGS. 11 and 12 show flowcharts illustrating methods that support receivers for NTNs in accordance with one or more aspects of the present disclosure.

DETAILED DESCRIPTION

Figure 1:
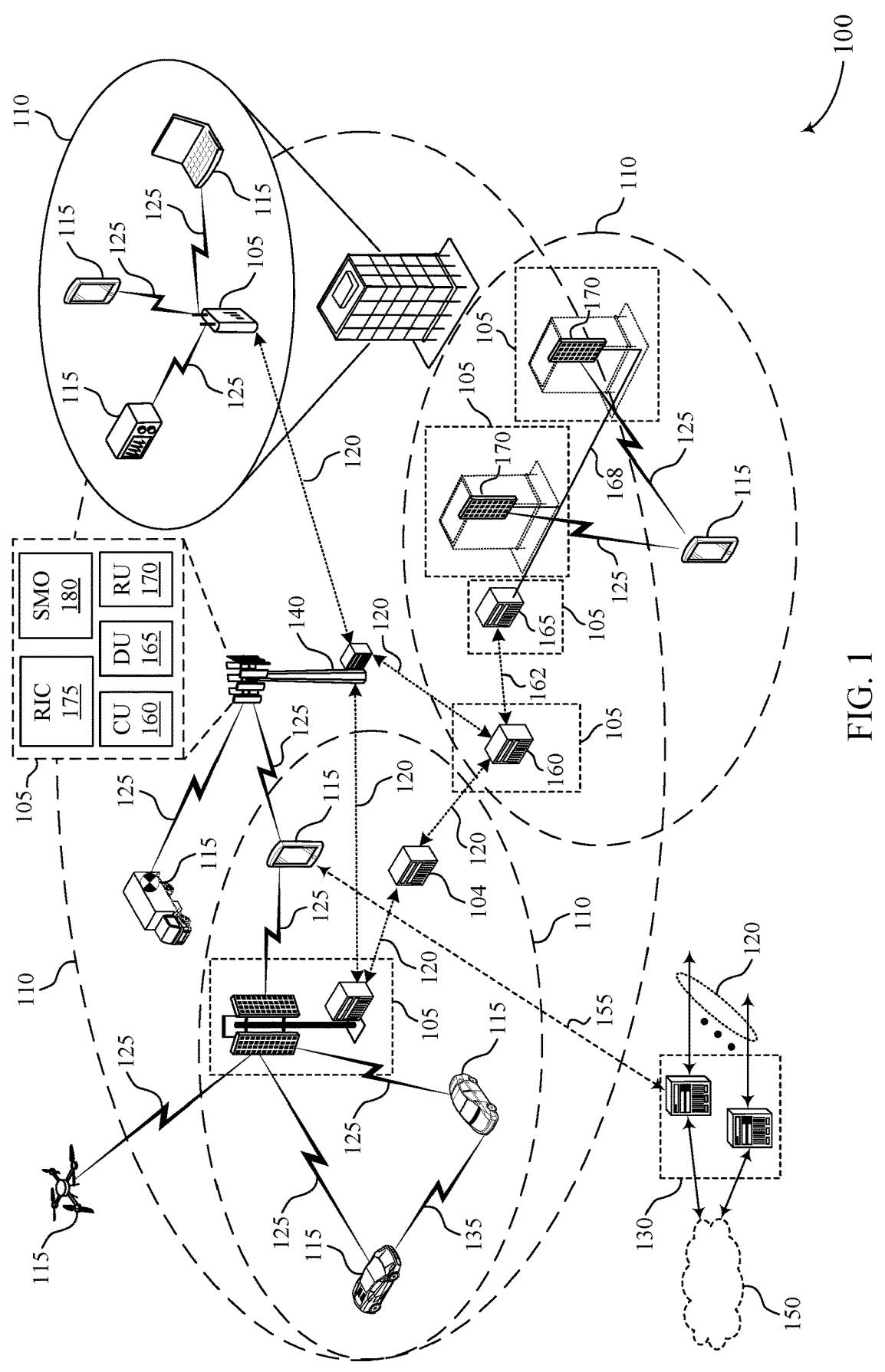
FIG. 1 shows an example of a wireless communications system that supports receivers for non-terrestrial networks (NTNs) in accordance with one or more aspects of the present disclosure.

Some wireless communications systems provide communications between user equipments (UEs) and non-terrestrial networks (NTNs). A NTN may include one or more NTN nodes (e.g., satellites). When communicating with low Earth orbit (LEO) satellites, a signal received by a UE may exhibit a time-varying carrier frequency shift or Doppler shift up to 24 parts per million (ppm). For example, satellite motion relative to a stationary UE receiver may cause a Doppler shift in NTNs. For instance, a signal from a NTN node may exhibit approximately 100 kilohertz (kHz) of Doppler shift for a 4 gigahertz (GHz) center frequency. In some approaches, coarse Doppler estimation during an initial acquisition period may be utilized when the satellite position is unknown. Fine Doppler tracking may be performed after connecting to the satellite. For example, the Doppler shift may be estimated or computed based on satellite position or speed. In some approaches, the estimated Doppler may be compensated using a receiver local oscillator or may be compensated digitally after analog-to-digital conversion.

Signals received from an NTN node may undergo processing in a receiver front-end (RxFE). For instance, a UE may include a digital RxFE for received signal processing. For example, digital RxFE hardware may support one or more signal processing operations. In some approaches, an analog signal received via one or more antennas may be processed in a software-defined radio (SDR) and provided to an analog-to-digital converter (ADC). Signal samples from the ADC may be decimated and rotated (e.g., decimated, rotated, and decimated again). For instance, the RxFE may filter and down-sample the digital signal from an oversampled ADC output to produce a signal at target sampling rates for a modem. Out-of-band jammer rejection may be performed before down-sampling to avoid aliasing effects. Frequency offset or doppler compensation may be performed with a digital rotator. The resulting signal may exhibit signal droop and may be provided to an undrooping filter. The undrooping filter may perform time-domain droop correction using finite impulse response (FIR) filtering to compensate for signal droop resulting from analog or digital filters.

Signal droop may result from analog or digital filtering. For example, analog or digital front end receivers may be designed as low pass or band pass filters to extract target carrier frequencies from the radio frequency (RF) spectrum. The filtering introduces non-flat in-band responses, where the overall in-band response from the analog or digital front end is referred as droop. If droop is not compensated, the droop may manifest as additional filtering on top of actual channel responses, which may be detrimental to downlink performance. For example, non-flat end-to-end spectrum in an additive white Gaussian noise (AWGN) channel may degrade peak throughput. In some examples, droop may be established a priori at the receiver based on the analog or digital filter lineup and may be compensated on the UE side. In some approaches to droop compensation, time domain droop correction may be performed using a FIR filter with N taps. In some approaches to droop compensation, frequency domain droop correction per subcarrier may be performed after fast Fourier transform (FFT) processing on the modem side by multiplying each subcarrier in the frequency domain by an inverse of the droop for that subcarrier.

Some examples of the techniques described herein may address the effects of NTN Doppler on front end processing (e.g., digital RxFE processing). In some approaches, Doppler shift may be compensated (e.g., corrected) by an RxFE rotator, and Doppler-dependent droop compensation may be performed using a compensation filter after the RxFE rotator. For mission mode scenarios with a doppler estimate, droop at the RxFE output may vary with a Doppler offset. For instance, without a Doppler offset, the received signal may be centered and droop may be symmetric at the RxFE output. With a non-zero Doppler offset, the received signal may not be centered, and droop may be asymmetric at the RxFE output. Doppler compensation may be performed at the rotator. Some examples of the techniques described herein may provide a Doppler-dependent droop compensation filter. For instance, an FIR filter or post FFT undrooping filter may be a function of the Doppler offset. In some approaches, a droop compensation filter may be computed offline based on a priori analog or digital filter responses. Doppler-dependent droop compensation may be generated dynamically based on an estimated Doppler offset. In some cases, filter generation may be relatively computationally costly. To reduce computation complexity or power consumption, a filter (e.g., filter coefficients) may be computed for some Doppler frequencies or when the Doppler shift changes by a threshold (e.g., delta threshold) quantity.

In some approaches, Doppler-independent droop compensation may be performed. For example, a droop compensation filter may be designed for a bandwidth (e.g., a relatively wider bandwidth) that addresses a Doppler shift (e.g., a maximum Doppler offset). For instance, the undrooping filter bandwidth may equal an occupied bandwidth (BW) plus two times the Doppler offset (e.g., BW+2*Fd, where Fd is a maximum Doppler offset). In some approaches, the undrooping filter may be situated before the rotator, where Doppler compensation may be performed at the rotator. With droop compensation performed before the rotator, the spectrum may be flattened over a wider bandwidth, which may provide a flattened response after rotation. In some cases, the undrooping filter may have fixed coefficients that are independent of the dynamic Doppler shift occurring at runtime. The same coefficients may be utilized during an initial acquisition period and during a mission mode (when Doppler shift estimation may be available, for example). In some approaches, droop compensation performed before signal rotation may leave droop due to decimators after the rotator uncompensated. In some approaches, separate droop compensation filters may be utilized for terrestrial network (TN)

signals and NTN signals in the same band. For example, a post-rotator droop compensation filter may be utilized for TN signals, and a pre-rotator droop compensation filter may be utilized for NTN signals. Utilizing separate filters may provide a flatter in-band response or improved jammer (e.g., out of band noise) rejection with fewer taps.

Aspects of the disclosure are initially described in the context of wireless communications systems. Aspects of the disclosure are also described in the context of block diagrams and a process flow. Aspects of the disclosure are further illustrated by and described with reference to apparatus diagrams, system diagrams, and flowcharts that relate to receivers for NTNs.

FIG. 1 shows an example of a wireless communications system 100 that supports receivers for NTNs in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104. That is, an IAB donor may be referred to as a parent node in communication with one or more child nodes (e.g., an IAB donor may relay transmissions for UEs through other IAB node(s) 104). Additionally, or alternatively, IAB node(s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes, or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multicarrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may support synchronous or asynchronous operation. For synchronous operation, network entities 105 (e.g., base stations 140) may have similar frame timings, and transmissions from different network entities (e.g., different ones of the network entities 105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Some wireless communications systems provide communications between UEs 115 and NTNs. A NTN may include one or more NTN nodes (e.g., satellites). When communicating with LEO satellites, a signal received by a UE 115 may exhibit a time-varying carrier frequency shift or Doppler shift up to 24 ppm. For example, satellite motion relative to a stationary UE receiver may cause a Doppler shift in NTNs. For instance, a signal from a NTN node may exhibit approximately 100 kHz of Doppler shift for a 4 GHz center frequency. In some approaches, coarse Doppler estimation during an initial acquisition period may be utilized when the satellite position is unknown. Fine Doppler tracking may be performed after connecting to the satellite. For example, the Doppler shift may be estimated or computed based on satellite position or speed. In some approaches, the estimated Doppler may be compensated using a receiver local oscillator or may be compensated digitally after analog-to-digital conversion.

Signals received from an NTN node may undergo processing in an RxFE. For instance, a UE 115 may include a digital RxFE for received signal processing. For example, digital RxFE hardware may support one or more signal processing operations. In some approaches, an analog signal received via one or more antennas may be processed in an SDR and provided to an ADC. Signal samples from the ADC may be decimated and rotated (e.g., decimated, rotated, and decimated again). For instance, the RxFE may filter and down-sample the digital signal from an oversampled ADC output to produce a signal at target sampling rates for a modem. Out-of-band jammer rejection may be performed before down-sampling to avoid aliasing effects. Frequency offset or doppler compensation may be performed with a digital rotator. The resulting signal may exhibit signal droop and may be provided to an undrooping filter. The undrooping filter may perform time-domain droop correction using FIR filtering to compensate for signal droop resulting from analog or digital filters.

Signal droop may result from analog or digital filtering. For example, analog or digital front end receivers may be designed as low pass or band pass filters to extract target carrier frequencies from the RF spectrum. The filtering introduces non-flat in-band responses, where the overall in-band response from the analog or digital front end is referred as droop. If droop is not compensated, the droop may manifest as additional filtering on top of actual channel responses, which may be detrimental to downlink performance. For example, non-flat end-to-end spectrum in an AWGN channel may degrade peak throughput. In some examples, droop may be established a priori at the receiver based on the analog or digital filter lineup and may be compensated on the UE 115 side. In some approaches to droop compensation, time domain droop correction may be performed using a FIR filter with N taps. In some approaches to droop compensation, frequency domain droop correction per subcarrier may be performed after FFT processing on the modem side by multiplying each subcarrier in the frequency domain by an inverse of the droop for that subcarrier.

Some examples of the techniques described herein may address the effects of NTN Doppler on front end processing (e.g., digital RxFE processing). In some approaches, a UE 115 may perform Doppler-dependent droop compensation using an RxFE rotator. For mission mode scenarios with a doppler estimate, droop at the RxFE output may vary with a Doppler offset. For instance, without a Doppler offset, the received signal may be centered and droop may be symmetric at the RxFE output. With a non-zero Doppler offset, the received signal may not be centered, and droop may be asymmetric at the RxFE output. Doppler compensation may be performed at the rotator. Some examples of the techniques described herein may provide a Doppler-dependent droop compensation filter. For instance, an FIR filter or post FFT undrooping filter may be a function of the Doppler offset. In some approaches, a droop compensation filter may be computed offline based on a priori analog or digital filter responses. Doppler-dependent droop compensation may be generated dynamically based on an estimated Doppler offset. In some cases, filter generation may be relatively computationally costly. To reduce computation complexity or power consumption, a filter (e.g., filter coefficients) may be computed for some Doppler frequencies or when the Doppler shift changes by a threshold (e.g., delta threshold) quantity.

In some approaches, Doppler-independent droop compensation may be performed. For example, a droop compensation filter may be designed for a bandwidth (e.g., a relatively wider bandwidth) that addresses a Doppler shift (e.g., a maximum Doppler offset). For instance, the undrooping filter bandwidth may equal an occupied bandwidth (BW) plus two times the Doppler offset (e.g., BW+2*Fd, where Fd is a maximum Doppler offset). In some approaches, the undrooping filter may be situated before the rotator, where Doppler compensation may be performed at the rotator. With droop compensation performed before the rotator, the spectrum may be flattened over a wider bandwidth, which may provide a flattened response after rotation. In some cases, the undrooping filter may have fixed coefficients that are independent of the dynamic Doppler shift occurring at runtime. The same coefficients may be utilized during an initial acquisition period and during a mission mode (when Doppler shift estimation may be available, for example). In some approaches, droop compensation performed before signal rotation may leave droop due to decimators after the rotator uncompensated. In some approaches, separate droop compensation filters may be utilized for TN signals and NTN signals in the same band. For example, a post-rotator droop compensation filter may be utilized for TN signals, and a pre-rotator droop compensation filter may be utilized for NTN signals. Utilizing separate filters may provide a flatter in-band response or improved jammer (e.g., out of band noise) rejection with fewer taps.

Figure 2:
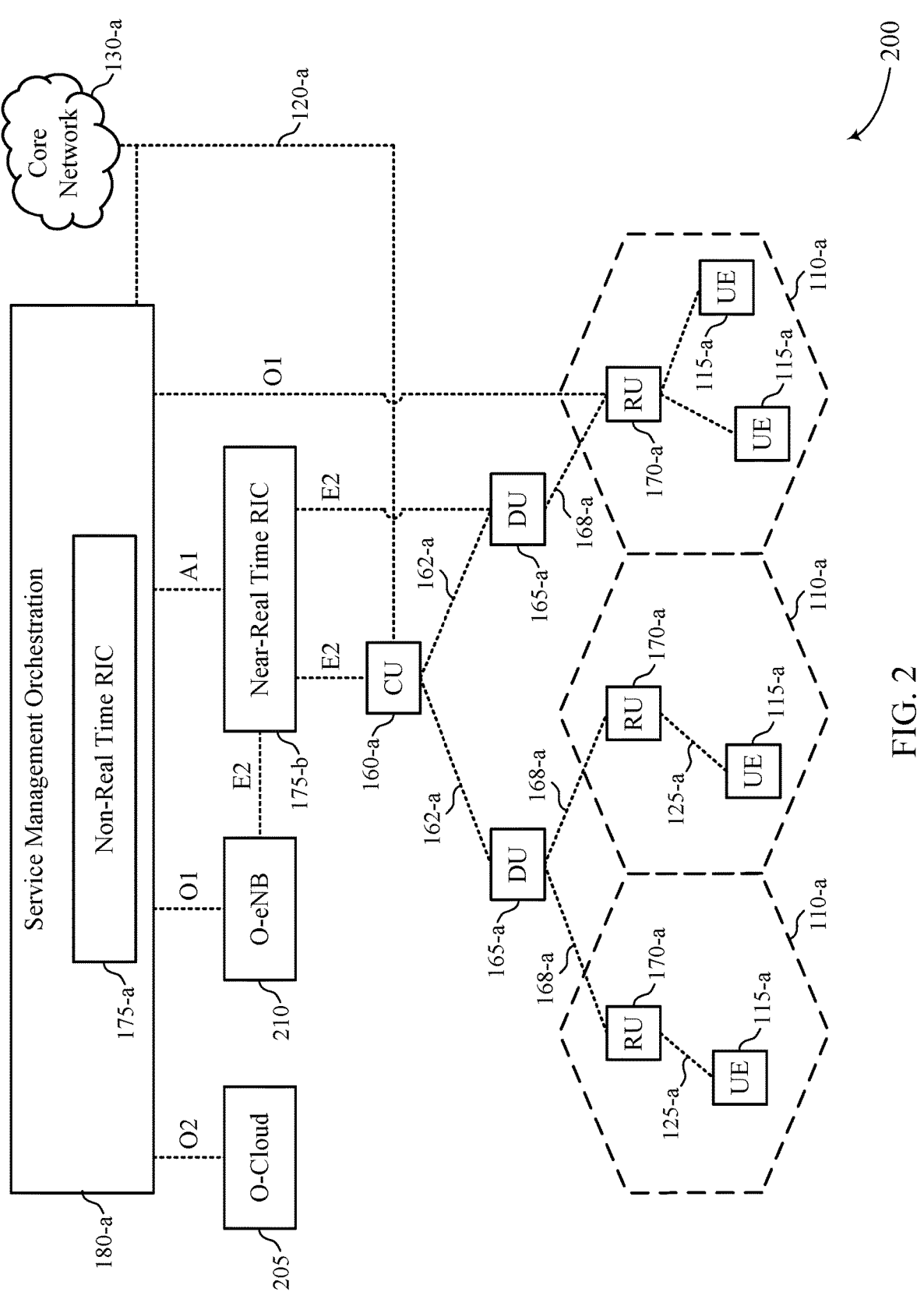
FIG. 2 shows an example of a network architecture that supports receivers for NTNs in accordance with one or more aspects of the present disclosure.

FIG. 2 shows an example of a network architecture 200 (e.g., a disaggregated base station architecture, a disaggregated RAN architecture) that supports receivers for NTNs in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Some examples of the techniques described herein may be implemented by a UE 115-*a* or may be performed by a UE 115-*a*. For example, a UE 115-*a* may include one or more filters for droop compensation. In some approaches, a UE 115-*a* may perform Doppler-dependent droop compensation or Doppler-independent droop compensation. For instance, the UE 115-*a* may perform one or more of the techniques described with reference to FIG. 3 for droop compensation or jammer rejection. In some examples, a CU 160-*a*, DU 165-*a*, or RU 170-*a* may be implemented in a satellite (e.g., a LEO satellite). A UE 115-*a* may perform one or more of the techniques described herein to compensate for droop caused by relative motion (e.g., Doppler) between a satellite and the UE 115-*a* or caused by signal processing for carrier isolation.

Figure 3:
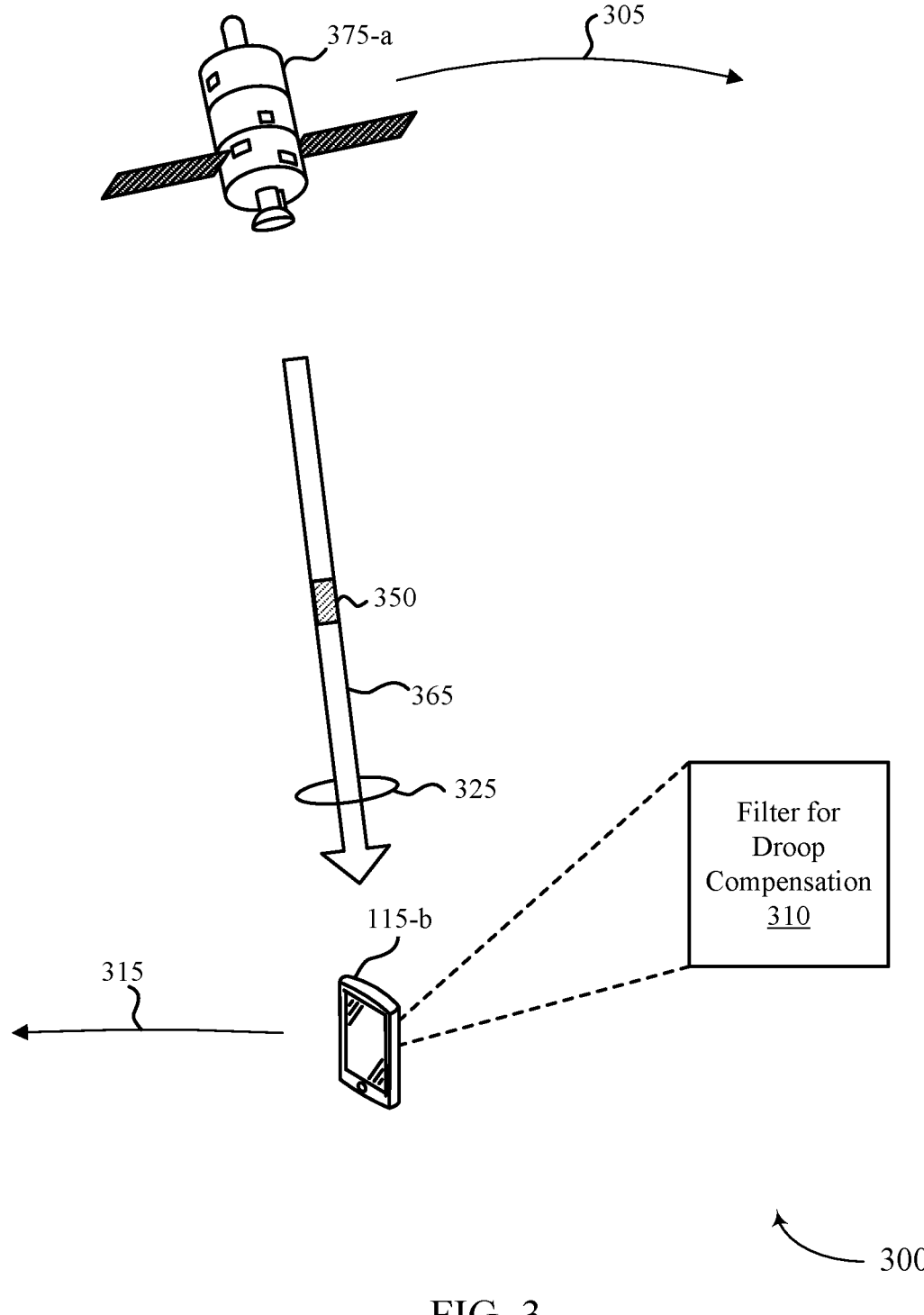
FIG. 3 shows an example of a wireless communications system that supports receivers for NTNs in accordance with one or more aspects of the present disclosure.

FIG. 3 shows an example of a wireless communications system 300 that supports receivers for NTNs in accordance with one or more aspects of the present disclosure. In some examples, the wireless communications system 300 may implement aspects of the wireless communications system 100 or the network architecture 200. The wireless communications system 300 may include a UE 115-*b* and an NTN node 375-*a*. With reference to FIG. 1, the UE 115-*b* may be an example of the UE 115 or the UE 115-*a*, the NTN node 375-*a* may be an example of the DU 165, or a combination thereof.

In some examples, the NTN node 375-*a* may be a high altitude platform station (HAPS), high altitude vehicle (HAV), balloon, etc. For instance, the NTN node 375-*a* may be in an orbit, such as low earth orbit, medium earth orbit, geostationary earth orbit, or other non-geostationary earth orbit. The NTN node 375-*a* may be positioned at some distance from Earth (e.g., hundreds or thousands of kilometers from Earth), which may vary or remain relatively fixed. The NTN node 375-*a* may include communication circuitry (e.g., one or more processors, memories, modems, baseband circuitries, among other examples), one or more antennas, or one or more transponders to facilitate reception and transmission of RF signals. The NTN node 375-*a* may serve a geographic region for an NTN.

In some examples, the wireless communications system 300 may include one or more other NTN nodes or one or more TN nodes (not shown in FIG. 3). For instance, the UE 115-*b* may communicate with one or more NTN nodes or one or more TN nodes. In some examples, a TN node may be positioned on the Earth's surface or relatively near to the Earth's surface (e.g., within a mile of the Earth's surface). In some examples, a TN node may be anchored or attached to the Earth's surface. A TN node may include communication circuitry (e.g., one or more processors, memories, modems, baseband circuitries, among other examples) or one or more antennas to facilitate reception and transmission of RF signals. In some examples, a TN node may provide communication service within a cell area. In some cases, the cell area may be included within a geographic region served by the NTN node 375-*a*, may partially overlap with the geographic region, or may be located outside of the geographic region.

In some examples, network (e.g., RAN) functionality may be split between the NTN node 375-*a* (e.g., a satellite, an RU on a satellite, or a gNB DU of the RAN, among other examples) and a TN node (e.g., a DU located on the ground or gNB CU of the RAN, among other examples). For instance, the NTN node 375-*a* may be a DU 165 (e.g., may implement DU 165 functionality) and the TN node may be a CU (e.g., may implement CU 160 functionality). In some examples, the NTN node and the TN node are next generation radio access network (NG-RAN) nodes. In some examples, a CU 160 and a DU 165 may reside on the ground and may be associated with one or more terrestrial and non-terrestrial cells or RUs. In a NTN, one or more DUs 165 may be located on a satellite and a CU 160 may be located on the Earth's surface. In some examples, the NTN node 375-*a* and a TN node may be included in a RAN (e.g., NG-RAN) portion of the wireless communications system 300. In some examples, a UE 115-*b* may be excluded from the RAN (e.g., NG-RAN) portion of the wireless communications system 300.

The UE 115-*b* may communicate with the NTN node 375-*a* using a communication link 325. The communication link 325 between the UE 115-*b* and the NTN node 375-*a* may be an example of the communication links 125 described with respect to FIG. 1.

The communication link 325 may be a unidirectional link for downlink communications or may include a bi-directional link that enables uplink or downlink communications. For example, the NTN node 375-*a* may transmit one or more downlink signals on a downlink 365 (e.g., downlink channel(s), downlink resource(s)), such as downlink control signals or downlink data signals, to the UE 115-*b* using the communication link 325. In some cases, the UE 115-*b* may transmit one or more signals on an uplink (e.g., uplink channel(s), uplink resource(s), not shown in FIG. 3), such as uplink control signals or uplink data signals, to the NTN node 375-*a* using the communication link 325.

The NTN node 375-*a* may change position (e.g., movement 305) relative to the UE 115-*b*. Additionally, or alternatively, the UE 115-*b* may change position (e.g., movement 315) relative to the NTN node 375-*a*. For instance, relative motion between the NTN node 375-*a* and the UE 115-*b* may occur due to an orbit of the NTN node 375-*a*, due to movement of the Earth, due to motion of the UE 115-*b*, a combination thereof. The relative motion between the NTN node 375-*a* and the UE 115-*b* may result in a carrier frequency shift in signaling between the NTN node 375-*a* and the UE 115-*b*.

The NTN node 375-*a* may transmit, or the UE 115-*b* may receive, a first signal 350 from the NTN node 375-*a*. The first signal 350 may be associated with the carrier frequency shift from the relative motion between the UE 115-*b* and the NTN node 375-*a*. For instance, the first signal 350 may be a signal (e.g., control signal, data signal, or other signal) that exhibits a carrier frequency shift (e.g., Doppler shift) due to the relative motion (e.g., the movement 305 of the NTN node 375-*a*, the movement 315 of the UE 115-*b*, or a combination thereof) between the NTN node 375-*a* and the UE 115-*b*. The carrier frequency shift may be an increase in the carrier frequency (when the relative motion shortens the distance between the NTN node 375-*a* and the UE 115-*b*) or a decrease in the carrier frequency (when the relative motion lengthens the distance between the NTN node 375-*a* and the UE 115-*b*). The carrier frequency offset (or Doppler offset) may range between −Fd and Fd. In some scenarios, Fd=2× $10^6$, $1 \times 10^6$, $7.5 \times 10^5$, $5 \times 10^5$, $2.5 \times 10^5$, $1 \times 10^5$, $0.5 \times 10^5$, or another value.

The UE 115-*b* may process the first signal 350. For example, the UE 115-*b* may perform filtering or decimation on the first signal 350 to obtain (e.g., isolate) the carrier of the first signal 350. In some cases, the processing of the first signal 350 may result in "droop" in the first signal 350. In some examples, droop may be characterized as approximately 0 decibels (dB) power at a center frequency (e.g., at a target frequency of a carrier) and increasing attenuation with increasing or decreasing frequency from the center frequency. For instance, the power of a droop profile may vary with an inverted parabolic shape centered at the center frequency, with a power of less than −14 dB at $\pm 10 \times 10^6$ Hz from the center frequency and a power of 0 dB at the center frequency. Because the carrier frequency shift may shift the carrier signal away from the center frequency, performing droop compensation without accounting for the carrier frequency shift may result in non-uniform signal filtering (e.g., providing insufficient amplification to a portion of a signal or excess amplification to another portion of a signal).

The UE 115-*b* may include a filter 310 (e.g., one or more filters) for droop compensation. In some examples, the filter 310 may include a first filter for droop compensation with fixed filter coefficients, a second filter for droop compensation with filter coefficients based on the carrier frequency shift, or a combination thereof. For instance, the UE 115-*b* may filter the first signal 350 using the first filter for droop compensation with fixed filter coefficients or the second filter for droop compensation with filter coefficients based on the carrier frequency shift. In some examples, the UE 115-*b* may demodulate the first signal 350 that is filtered using the first filter or the second filter. For example, the first signal 350 may be demodulated using a modem, which may extract symbols or information (e.g., bits) from the signal. The symbols or information may be utilized for one or more operations (e.g., control, presentation, or relay, among other examples) by the UE 115-*b*.

The filtering of the first signal 350 may be performed before signal rotation, after signal rotation, or a combination thereof. Signal rotation may be a procedure for shifting the frequency of the first signal 350 (e.g., shifting the frequency of the first signal 350 to compensate for the carrier frequency shift).

In some aspects, the first filter may have a bandwidth that includes a carrier bandwidth and a limited carrier frequency offset for filtering the first signal 350 before signal rotation. For instance, the first filter may be utilized to perform Doppler-independent droop compensation. In some approaches, the filter 310 for droop compensation may be designed for a bandwidth (e.g., a relatively wider bandwidth) that addresses the Doppler shift (e.g., a maximum Doppler offset). For instance, the undrooping filter bandwidth may equal an occupied bandwidth plus two times the Doppler offset (e.g., BW+2*Fd, where Fd is a maximum Doppler offset). In some approaches, the filter 310 may be utilized before the signal rotation, where Doppler compensation may be performed at the rotator. With droop compensation performed before the rotator, the spectrum may be flattened over a wider bandwidth, which may provide a flattened response after rotation. In some cases, the undrooping filter may have fixed coefficients that are independent of the dynamic Doppler shift occurring at runtime. An example of the first filter is given with reference to FIG. 4.

In some aspects, the second filter may have a bandwidth that is based on a carrier bandwidth and the carrier frequency shift for filtering the first signal 350 after signal rotation. For instance, the second filter may be utilized to perform Doppler-dependent droop compensation. In some approaches, the UE 115-*b* may compensate for the carrier frequency shift via a rotator, where the second filter is determined based on the carrier frequency shift compensated via the rotator. For example, Doppler-dependent droop compensation may be performed using an RxFE rotator. For mission mode scenarios with a doppler estimate, droop at the RxFE output may vary with a Doppler offset. Without a Doppler offset, a signal from the NTN node 375-*a* may be centered and droop may be symmetric at the RxFE output. With a non-zero Doppler offset, the first signal 350 may not be centered, and droop may be asymmetric. In some examples, the second filter may be an FIR filter or a post FFT filter that is a function of the Doppler offset. For instance, the UE 115-*b* may generate the second filter (e.g., second filter coefficients) dynamically based on an estimated carrier frequency offset. In some examples, the second filter may be generated to have a bandwidth that extends to a carrier bandwidth plus the carrier frequency shift. An example of the second filter is given with reference to FIG. 4.

Because filter generation (e.g., filter coefficient computation) can consume computational resources, one or more approaches may be utilized to reduce or avoid frequent or repetitive filter generation. The UE 115-*b* may determine (e.g., update) the second filter in response to the carrier frequency shift being within a frequency range or may determine (e.g., update) the second filter in response to the carrier frequency shift differing by a threshold quantity from a previous carrier frequency shift. For example, the second filter (e.g., filter coefficients) may be computed for some carrier frequency shifts (e.g., when the carrier frequency shift moves from a first range of carrier frequency shift to a second range of carrier frequency shift) or when the carrier frequency shift changes by a threshold quantity (e.g., when a current carrier frequency shift is greater than a threshold quantity from a previous carrier frequency shift). For instance, the UE 115-*b* may generate an updated second filter when a current estimated carrier frequency shift is greater than a threshold quantity (e.g., 500 Hz, 1 kHz, 5 kHz, 10 kHz, 25 kHz, 50 kHz, or another threshold quantity). Accordingly, filter computation may be avoided until the carrier frequency shift changes to a degree or enters a different range of carrier frequency shifts.

In some approaches, the same coefficients for the filter 310 may be utilized during an initial acquisition period and during a mission mode (when Doppler shift estimation may be available, for example). In some cases, droop compensation performed before signal rotation may leave uncompensated droop due to decimation after the signal rotation.

In some approaches, differing techniques may be utilized based on whether the UE 115-*b* is in acquisition mode or during mission mode. For example, the first signal 350 may be received during an initial acquisition period before determining the carrier frequency shift, and the UE 115-*b* may filter the first signal 350 using the first filter. The UE 115-*b* may receive a second signal from the NTN node 375-*a* (during mission mode, for instance), and may compensate for the carrier frequency shift in the second signal using a local oscillator after the initial acquisition period based on determining the carrier frequency shift. Mission mode may provide a carrier frequency shift (e.g., Doppler) estimate, where the carrier frequency shift may be compensated for in a receiver local oscillator (RxLO) before analog-to-digital conversion (e.g., before an ADC). In this case, the received signal may be approximately centered or droop may be approximately symmetric. In some approaches, a similar undroop filter may be employed for TN and NTN scenarios. During the initial acquisition mode with an unknown carrier frequency shift (e.g., Doppler), the UE 115-*b* may employ the first filter (e.g., droop compensation for a wider bandwidth based on a maximum carrier frequency offset). During mission mode, carrier frequency shift compensation may be performed by the local oscillator in some approaches. While in mission mode, the bandwidth of the first filter may be adjusted (e.g., reduced or narrowed), or another filter with a different bandwidth (e.g., a reduced bandwidth relative to the bandwidth of the first filter) may be utilized.

In some aspects, one or more additional filters may be utilized for different signals (e.g., signals from the NTN node 375-*a* and signals from a TN node). For example, separate droop compensation filters may be utilized for TN signals and NTN signals in the same band. In some cases, the UE 115-*b* may receive a second signal from a TN node (not shown in FIG. 3), where the second signal overlaps (e.g., partially or completely overlaps) in a frequency band with the first signal 350. The UE 115-*b* may filter the second signal using a filter for droop compensation after signal rotation. The filter may have a bandwidth that is less than the bandwidth of the first filter. For example, a post-rotator droop compensation filter may be utilized for TN signals, and a pre-rotator droop compensation filter may be utilized for NTN signals. Utilizing separate filters may provide a flatter in-band response or improved jammer (e.g., out of band noise) rejection with fewer taps.

In some aspects, one or more additional filters may be utilized for additional droop compensation. For example, the UE 115-*b* may filter the first signal 350 using the first filter and may filter the first signal 350 using another filter for droop compensation after signal rotation and decimation. The filter may have fixed coefficients based on a frequency response of a decimator for performing the decimation. In some approaches, the UE 115-*b* may filter the first signal 350 (using an additional filter, for instance) in a frequency domain after a frequency domain transformation (e.g., FFT) or in the time domain. Examples of one or more filters for additional droop compensation are given with reference to FIG. 5.

In some cases, the UE 115-*b* may perform jammer rejection with a carrier frequency shift (e.g., Doppler) due to the NTN. With a jamming signal from a TN and a signal from the NTN node 375-*a* (e.g., a satellite), the frequency spacing of the jamming signal to the signal from the NTN node 375-*a* may change based on the carrier frequency shift (e.g., Doppler). In some scenarios, a signal from the NTN node 375-*a* may be targeted to be centered at a frequency Fc, and a jamming signal may be centered at a frequency Fj. With the carrier frequency shift due to NTN node 375-*a* movement 305, the signal from the NTN node 375-*a* (e.g., the first signal 350 or another signal) may be received at Fc+Fd, while a jamming signal from a TN node may be received at Fj. The spacing between the signal from the NTN node 375-*a* and the jamming signal may be reduced, where Fj−(Fc+Fd)<Fj−Fc.

In some approaches, with closer spacing between the signal from the NTN node 375-*a* and a jamming signal, one or more tighter filters (e.g., digital filters) may be utilized to reject the out-of-band jamming signal. For example, a digital lineup or analog poles used at the UE 115-*b* may be different for the TN versus the NTN for the same band. The use of sharper filters may consume more power. In some examples, the UE 115-*b* may receive a signal (e.g., the first signal 350 or another signal) from the NTN node 375-*a*, where the second signal is associated with a carrier frequency shift. The UE 115-*b* may detect a jamming signal from a TN node, where the carrier frequency shift reduces a frequency domain spacing between the signal and the jamming signal. The UE 115-*b* may filter the signal using a filter for suppressing the jamming signal. The filter may have a steeper frequency response than the first filter or the second filter between the signal and the jamming signal for the reduced frequency domain spacing. In some examples, the UE 115-*b* may meet the same jammer target (e.g., performance) for NTN and TN signals.

In some examples, the UE 115-*b* RxFE filtering may satisfy different jammer targets in an NTN scenario versus a TN scenario for the same band. For instance, the UE 115-*b* may meet a relaxed performance target for jamming in the NTN scenario. The UE 115-*b* may meet a jammer performance target when the carrier frequency shift is near zero or within a threshold range from zero. In some aspects, the UE 115-*b* may be allowed to not satisfy the jammer performance target in NTN scenarios.

In some examples, the UE 115-*b* may receive a signal from the NTN node 375-*a* (e.g., the first signal 350 or another signal), where the signal is associated with a carrier frequency shift. The UE 115-*b* may detect a jamming signal from a TN node, where the carrier frequency shift causes a reduced frequency domain spacing between the signal and the jamming signal. The UE 115-*b* may filter the signal using the first filter or the second filter, where the first filter or the second filter provides reduced jamming performance relative to a signal without the reduced frequency domain spacing.

In some aspects, the jamming signal may be adjusted to account for signaling from the NTN node 375-*a*. For example, the power of the jamming signal may be relaxed or reduced. Additionally, or alternatively, the frequency location(s) of the jamming signal may be configured or changed based on the carrier frequency shift (e.g., Doppler shift). For instance, a jamming signal may be shifted away from the NTN signaling by the carrier frequency shift (e.g., by at least a maximum carrier frequency shift). In some examples, the UE 115-*b* or the NTN node 375-*a* may send a message to a TN node indicating the presence of NTN signaling, indicating a carrier frequency shift (of the first signal 350 from the NTN node 375-*a*, for instance), or indicating a request to reduce jamming signal power or to reconfigure the jamming signal to another frequency resource. The TN node may perform power control (e.g., to reduce jamming signal power) or change a frequency location of the jamming signal based on (e.g., in response to) the message. In some approaches, the TN node may detect a signal (e.g., the first signal 350) from the NTN and may adjust the jamming signal power or frequency.

Figure 4:
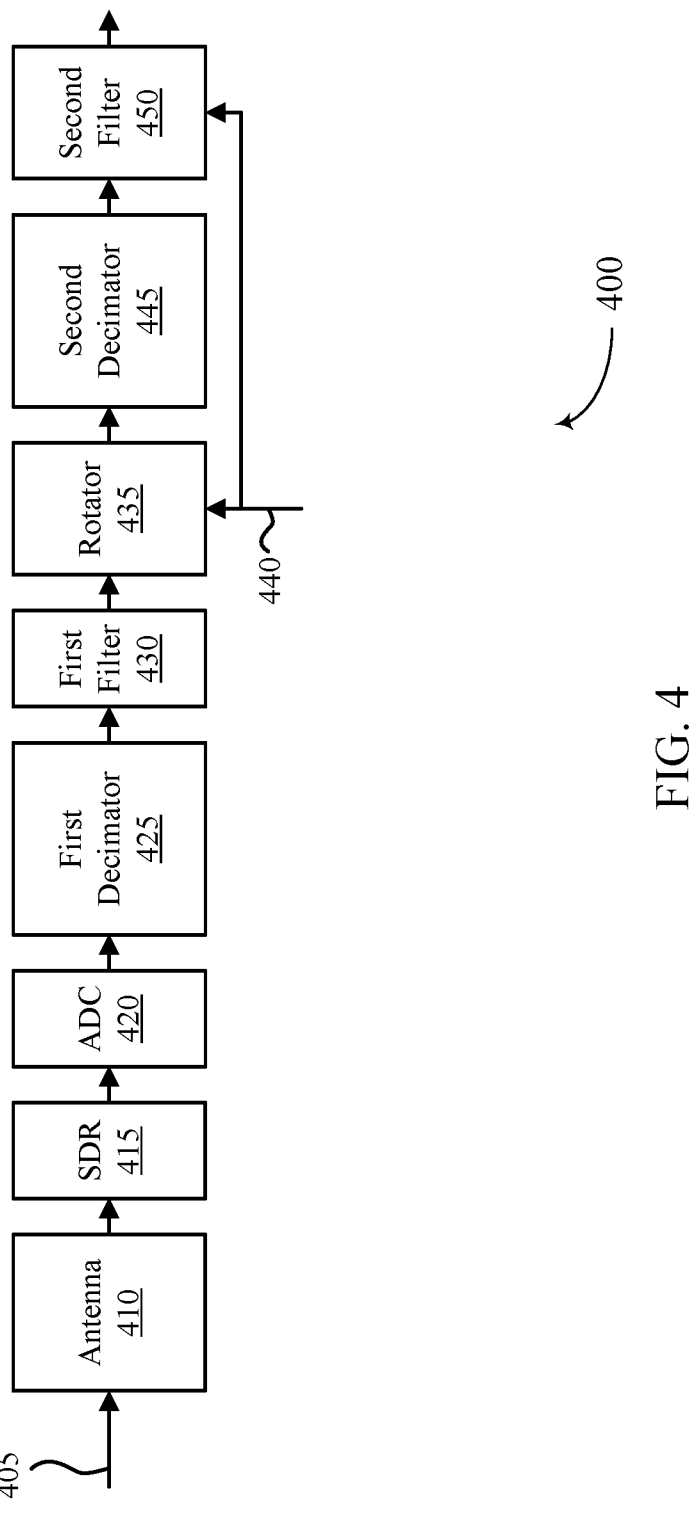
FIG. 4 shows an example of a block diagram that supports receivers for NTNs in accordance with one or more aspects of the present disclosure.

FIG. 4 shows an example of a block diagram 400 that supports receivers for NTNs in accordance with one or more aspects of the present disclosure. In some examples, one or more of the elements, structures, or operations described with reference to FIG. 4 may be performed by a UE (e.g., a UE 115, UE 115-*a*, or 115-*b*) or another device (e.g., network entity) that may be utilized in accordance with one or more of the techniques described herein. One or more of the elements described with reference to FIG. 4 may be implemented in hardware or a combination of hardware and instructions or code (e.g., a processor with instructions). For example, one or more antennas 410, an SDR 415, an ADC 420, a first decimator 425, a first filter 430, a rotator 435, a second decimator 445, or a second filter 450 may be implemented in hardware or a combination of hardware and instructions. In some examples, a UE 115-*b* may include the one or more antennas 410, SDR 415, ADC 420, first decimator 425, first filter 430, rotator 435, second decimator 445, or second filter 450.

A signal 405 may be received by one or more antennas 410. In some examples, the signal 405 may be an example of the first signal 350 described with reference to FIG. 3. The signal may be associated with (e.g., may exhibit) a carrier frequency shift (e.g., Doppler shift) as described with reference to FIG. 3. The signal may be provided to the SDR 415.

The SDR 415 may be a hardware element that operates based on instructions that configure one or more processing aspects of the SDR 415. In some examples, the SDR 415 may perform processing (e.g., filtering, low-pass filtering, band-pass filtering) on the signal. In some cases, the SDR 415 may introduce droop (e.g., analog droop) into the signal. The SDR 415 may provide the processed (analog) signal to the ADC 420.

The ADC 420 may sample the signal to produce a sampled version (e.g., digital samples) of the signal. In some examples, the ADC 420 may produce samples at a higher rate than one or more components (e.g., a modem). The sampled signal may be provided to the first decimator 425.

The first decimator 425 may decimate the (sampled) signal to generate a decimated signal. For example, the first decimator 425 may remove or drop a proportion of the samples of the signal. The first decimator 425 may reduce the sample rate of the signal. In some approaches, the signal may be provided to a first filter 430 for droop compensation, may bypass the first filter 430, or the first filter 430 may be excluded.

In some approaches, the first filter 430 may be an example of one or more of the filters (e.g., the filter 310, first filter, or another filter) described with reference to FIG. 3. As illustrated in FIG. 4, the first filter 430 may be situated before the rotator 435 in some aspects. In some examples, the first filter 430 may have a greater (e.g., wider) bandwidth for undrooping than a bandwidth of the signal 405. For instance, the bandwidth for droop compensation may cover a bandwidth of the signal 405 plus a limited carrier frequency shift (e.g., maximum Doppler shift to either side of the center frequency). In some examples, the bandwidth utilized for droop compensation may include a frequency region for flattening a spectral response of processing performed by one or more of the elements described with reference to FIG. 4. In some examples, the first filter 430 may filter the signal to compensate for droop. The signal (e.g., filtered signal or decimated signal) may be provided to the rotator 435.

The rotator 435 may rotate the signal to reduce or remove the carrier frequency shift in the signal. In some examples, the rotator 435 may utilize an estimate 440 of the carrier frequency shift to rotate the signal to reduce or remove the carrier frequency shift in the signal. In some examples, the estimate 440 of the carrier frequency shift may be provided (e.g., provided apriori) by a modem to the RxFE (e.g., to the rotator 435 and to the second filter 450). The (rotated) signal may be provided to the second decimator 445.

The second decimator 445 may decimate the signal. For example, the second decimator 445 may reduce or remove a portion of samples of the signal. In some approaches, the (decimated) signal may be provided to the second filter 450, may bypass the second filter 450, or the second filter 450 may be excluded. In some examples, the first filter 430 or the second filter 450 may be selected (to the exclusion of the other filter, for instance). In some examples, the first filter 430 and the second filter 450 may be utilized in some cases.

In some examples, the second filter 450 may be utilized to perform Doppler-dependent droop compensation. For instance, FIR filter coefficients may be adapted based on the estimate 440 of the carrier frequency. In some aspects, the second filter 450 may be generated (e.g., adapted, computed) based on the estimate 440 of the carrier frequency. For instance, the bandwidth or center frequency of the second filter 450 may be adapted to reduce or remove droop in the signal based on the estimate 440, where the bandwidth of the second filter 450 may include (e.g., may extend to or beyond) the bandwidth of the signal 405 and the estimate 440 of the carrier frequency shift. different undrooping bandwidths may lead to different FIR filter coefficients for the second filter 450 (e.g., droop compensation filter). The signal may be provided to a demodulator (e.g., modem) for further processing.

In some examples, the position of the first filter 430 or the second filter 450 may be configurable (e.g., the first filter 430 or the second filter 450 may be selectively included or bypassed). For instance, droop compensation may be performed prior to rotation or subsequent to rotation for carrier frequency shift compensation. In some cases, droop compensation or performance may be enhanced by performing droop compensation after rotation (e.g., at an end of an RxFE chain) for TN signals and before rotation for NTN signals. In some approaches, two droop compensation filters (e.g., the first filter 430 and the second filter 450) may be utilized for pre-rotator filtering or post-rotator filtering.

In some approaches, for a same band or signal bandwidth, the bandwidth for droop compensation may differ (e.g., may be adjusted or switched) based on whether the signal 405 is from an NTN or TN (e.g., whether the UE is connected to an NTN or TN). In some cases, a relatively smaller bandwidth may be utilized for TNs. For instance, a bandwidth of the first filter 430, a bandwidth of the second filter 450, or a bandwidth of another filter may be changed (e.g., adapted, adjusted, selected) based on whether the signal 405 is from an NTN or a TN.

In some aspects, different droop compensation bandwidths may be utilized based on whether the UE is connected to an NTN for initial acquisition mode (when carrier frequency shift is not yet estimated or established, for instance) and mission mode (when carrier frequency shift is estimated or established). For instance, a bandwidth of the first filter 430, a bandwidth of the second filter 450, or a bandwidth of another filter may be changed (e.g., adapted, adjusted, selected) based on whether the UE is in initial acquisition mode or mission mode.

In some aspects, jammer rejection may be adapted based on whether the signal 405 is from an NTN or a TN. For instance, poles or element lineups of the first filter 430, the second filter 450, or another filter may be changed (e.g., adapted, adjusted, selected) based on whether the signal 405 is from an NTN or a TN. In some aspects, jammer rejection performance may be relaxed for NTN signals relative to TN signals.

Figure 5:
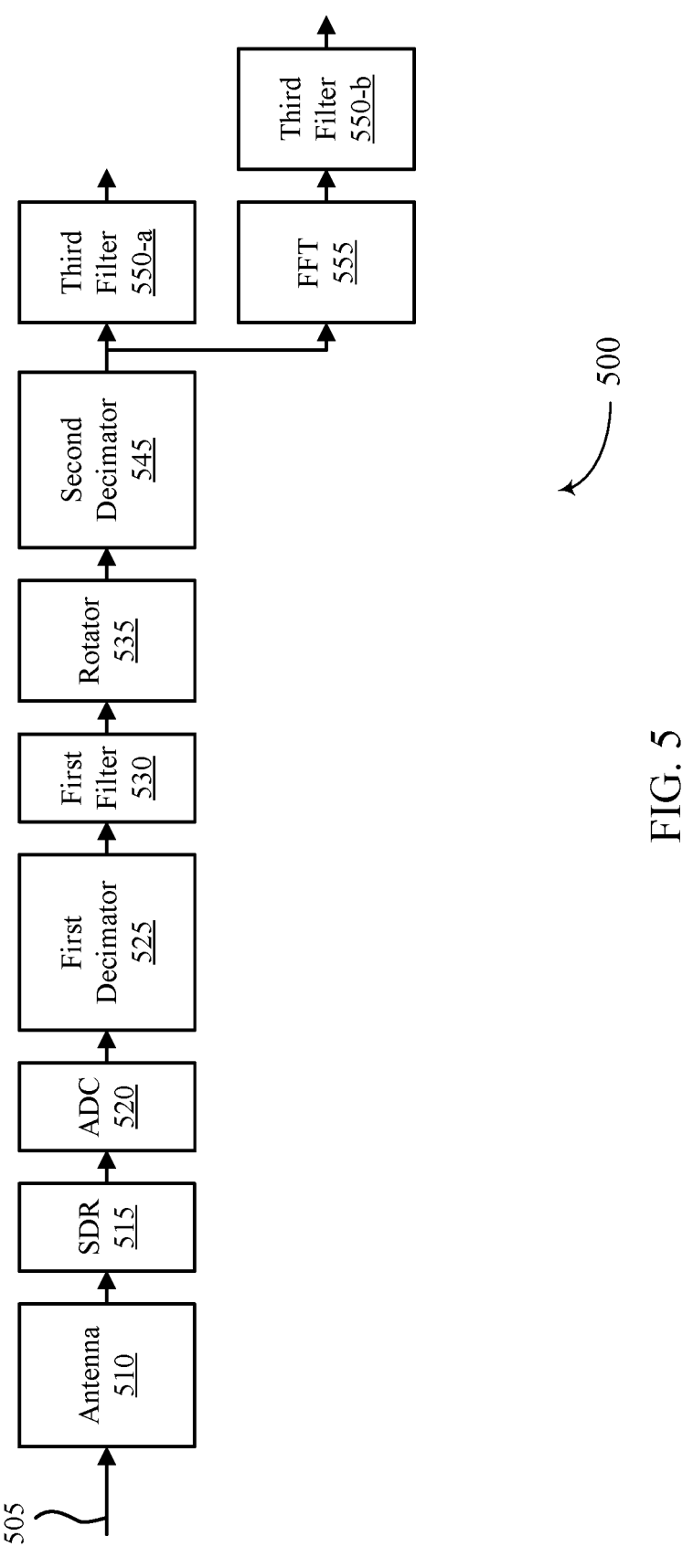
FIG. 5 shows an example of a block diagram that supports receivers for NTNs in accordance with one or more aspects of the present disclosure.

FIG. 5 shows an example of a block diagram 500 that supports receivers for NTNs in accordance with one or more aspects of the present disclosure. In some examples, one or more of the elements, structures, or operations described with reference to FIG. 5 may be performed by a UE (e.g., a UE 115, UE 115-a, or 115-b) or another device (e.g., network entity) that may be utilized in accordance with one or more of the techniques described herein. One or more of the elements described with reference to FIG. 5 may be implemented in hardware or a combination of hardware and instructions or code (e.g., a processor with instructions). For example, one or more antennas 510, an SDR 515, an ADC 520, a first decimator 525, a first filter 530, a rotator 535, a second decimator 545, a third filter 550-a, an FFT 555, or a third filter 550-b may be implemented in hardware or a combination of hardware and instructions. In some examples, a UE 115-b may include the one or more antennas 510, SDR 515, ADC 520, first decimator 525, first filter 530, rotator 535, second decimator 545, third filter 550-a, FFT 555, or third filter 550-b.

In some aspects, the one or more antennas 510, SDR 515, ADC 520, first decimator 525, first filter 530, rotator 535, or second decimator 545 may be examples of, or may operate similarly to, corresponding elements described in FIG. 4. In some approaches, one or more of the structures described with reference to FIG. 5 may be utilized in conjunction with one or more of the structures described with reference to FIG. 3 or FIG. 4.

FIG. 5 provide an example of utilizing multiple droop compensation filters, where the first filter 530 is situated before the rotator 535 and the third filter 550-a or the third filter 550-b is situated after the rotator 535. In some scenarios, carrier frequency shift (e.g., Doppler shift) may be compensated by the rotator 535 (e.g., an RxFE rotator).

With an additional third filter 550-a or third filter 550-b, droop introduced into a signal 505 from an NTN by the second decimator 545 (e.g., a narrowband decimator) may be compensated. In some examples, the second decimator 545 (or another element) may cause in-band ripples in a processed signal. In some approaches, the third filter 550-a or the third filter 550-b may utilize fixed coefficients for droop compensation based on one or more decimator responses.

In some examples, the third filter 550-a may perform time domain droop compensation, or the third filter 550-b may perform frequency domain droop compensation. For instance, the third filter 550-a may perform time domain droop compensation based on the signal from the second decimator 545. Additionally, or alternatively, the signal from the second decimator 545 may be provided to the FFT 555, which may transform the signal into the frequency domain. The third filter 550-b may perform droop compensation on the frequency-domain signal provided by the FFT. One or more of the filtering techniques described herein may be performed in the time domain (as an FIR filter, for instance) or in the frequency domain (as a post-FFT filter, for instance).

Figure 6:
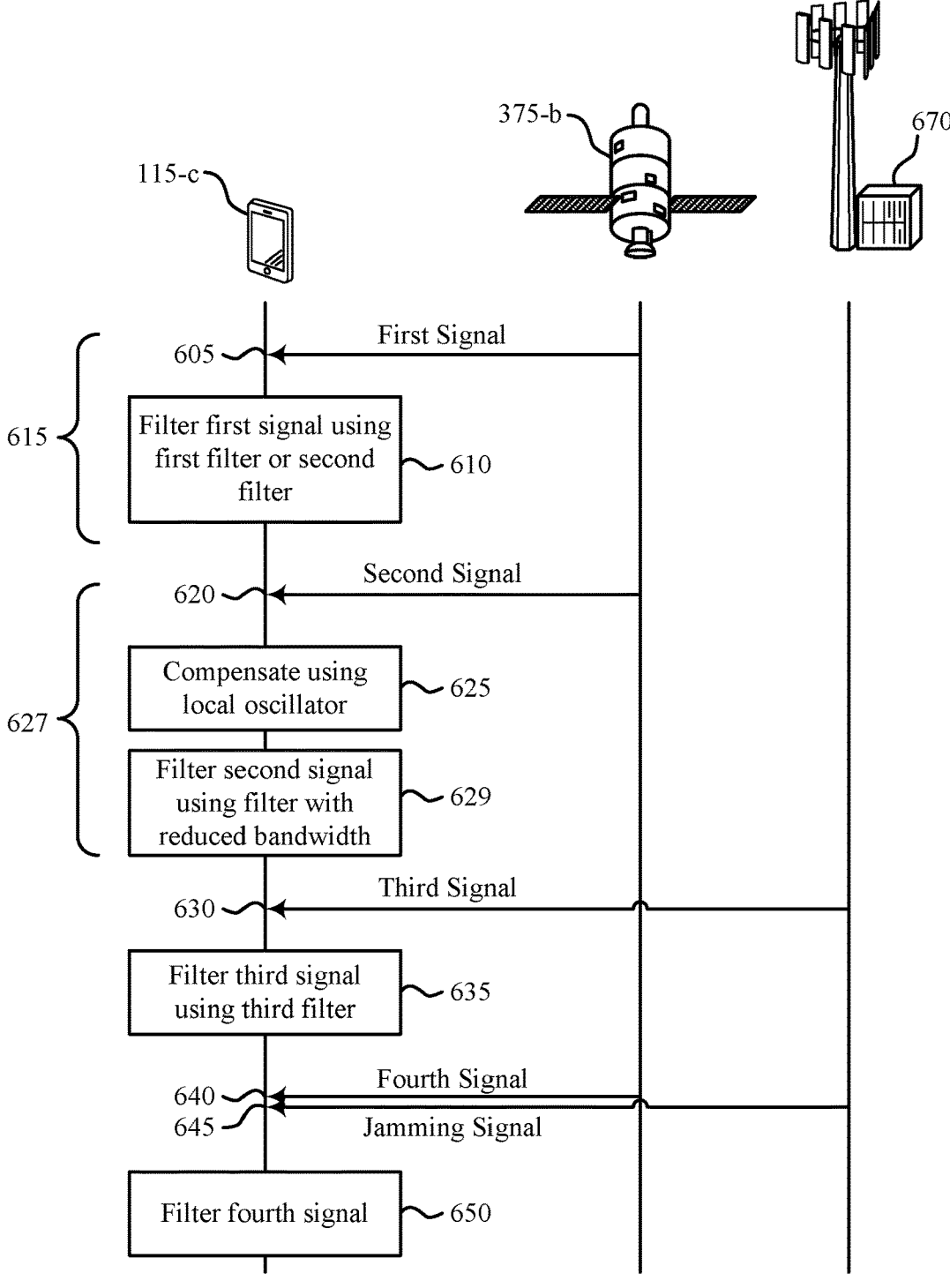
FIG. 6 shows an example of a process flow that supports receivers for NTNs in accordance with one or more aspects of the present disclosure.

FIG. 6 shows an example of a process flow 600 that supports receivers for NTNs in accordance with one or more aspects of the present disclosure. The process flow 600 may include a UE 115-c, which may be an example of UEs 115, 115-a, or 115-b, as described herein. The process flow 600 may also include a NTN node 375-b, which may be an example of the NTN node 375-a, as described herein. The process flow 600 may also include a TN node 670, which may be an example of a network entity 105 described with respect to FIG. 1 or the TN node described with respect to FIG. 3.

In the following description of the process flow 600, communications between the UE 115-c, the NTN node 375-b, or the TN node 670 may be transmitted in a different order than the example order shown, or the operations performed by the UE 115-c, the NTN node 375-b, or the TN node 670 may be performed in different orders or at different times. Some operations may also be omitted from the process flow 600, or other operations may be added to the process flow 600. Further, although some operations or signaling may be shown to occur at different times for discussion purposes, these operations may actually occur at the same time or in overlapping time periods in some examples.

At 605, the NTN node 375-b may transmit a first signal to the UE 115-c. For instance, the first signal may be transmitted to the UE 115-c as described with reference to one or more of FIGS. 3-5. Due to relative motion between the NTN node 375-b and the UE 115-c, the first signal may be associated with (e.g., may exhibit) a second carrier frequency shift. In some examples, the first signal may be transmitted or received while the UE 115-c is in an initial acquisition mode 615.

At 610, the UE 115-c may filter the first signal using a first filter or a second filter. For instance, the UE 115-c may filter the first signal using the first filter for (Doppler-independent) droop compensation or may filter the first signal using the second filter for (Doppler-dependent) droop compensation as described with reference to one or more of FIGS. 3-5.

At 620, the NTN node 375-a may transmit a second signal to the UE 115-c. For instance, the second signal may be transmitted to the UE 115-c as described with reference to one or more of FIGS. 3-5. Due to relative motion between the NTN node 375-b and the UE 115-c, the second signal may be associated with (e.g., may exhibit) a second carrier frequency shift. In some examples, the second signal may be transmitted or received while the UE 115-c is in a mission mode 627 (e.g., with an estimate of a carrier frequency shift).

At 625, the UE 115-c may compensate for the second carrier frequency shift using a local oscillator. For instance, the UE 115-c may compensate for the second carrier frequency shift in the second signal using the local oscillator after the initial acquisition mode 615 (e.g., initial acquisition period) based on determining (e.g., estimating) the second carrier frequency shift as described with reference to FIG. 3.

At 629, the UE 115-c may filter the second signal using a filter with a reduced bandwidth to compensate for droop. For instance, the UE 115-c may adjust the bandwidth of the first filter or may switch the first filter for another filter that has a reduced bandwidth relative to the bandwidth of the first filter as described with reference to FIG. 3. In some examples, receiving the second signal, compensating for the second carrier frequency shift, or filtering the second signal using a filter with a reduced bandwidth may be performed during the mission mode 627 (e.g., during a mission period).

At 630, the TN node 670 may transmit, or the UE 115-c may receive, a third signal. For example, the UE 115-c may receive a signal from the TN node 670 as described with reference to FIG. 3.

At 635, the UE 115-c may filter the third signal using a third filter. For instance, the UE 115-c may filter the third signal for droop compensation using a third filter with a bandwidth that is less than the bandwidth of the first filter as described with reference to FIG. 3.

At 640, the NTN node 375-b may transmit, or the UE 115-c may receive, a fourth signal. For example, the UE 115-c may receive a fourth signal from the NTN node 375-b as described with reference to FIG. 3.

At 645, the TN node 670 may transmit, or the UE 115-c may detect, a jamming signal. For example, the UE 115-c may detect a jamming signal from the TN node 670 as described with reference to FIG. 3.

At 650, the UE 115-c may filter the fourth signal using a fourth filter for suppressing the jamming signal. For instance, the UE 115-c may filter the fourth signal for jammer rejection using a fourth filter that has a steeper frequency response than the first filter or the second filter (for reduced frequency domain spacing, for example) as described with reference to FIG. 3.

Figure 7:
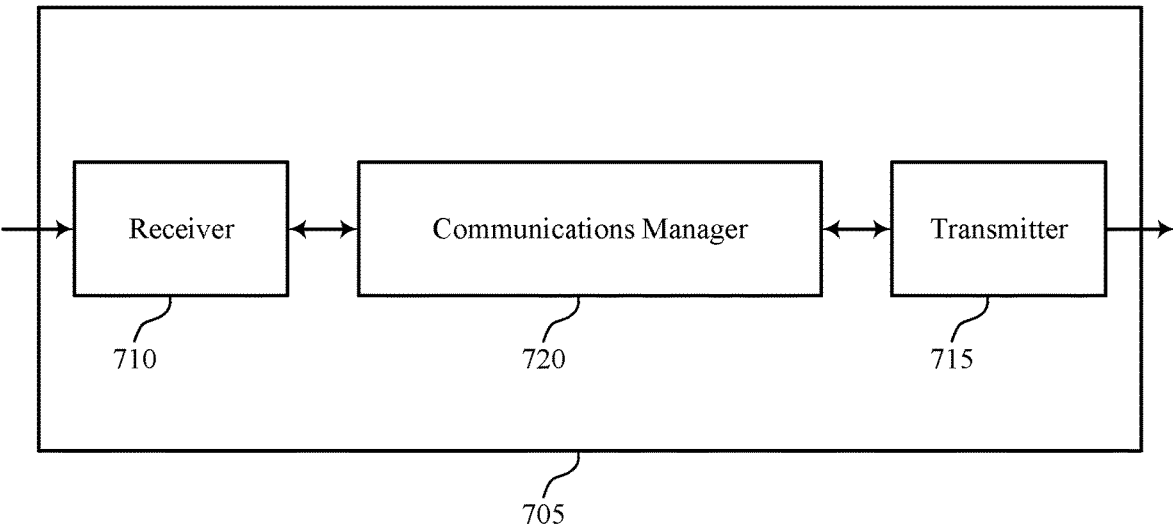
FIGS. 7 and 8 show block diagrams of devices that support receivers for NTNs in accordance with one or more aspects of the present disclosure.

FIG. 7 shows a block diagram 700 of a device 705 that supports receivers for NTNs in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to receivers for NTNs). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to receivers for NTNs). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations or components thereof may be examples of means for performing various aspects of receivers for NTNs as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor (e.g., referred to as a processor-executable code). If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. For example, the communications manager 720 is capable of, configured to, or operable to support a means for receiving a first signal from a NTN node, the first signal associated with a carrier frequency shift from relative motion between the UE and the NTN node. The communications manager 720 is capable of, configured to, or operable to support a means for filtering the first signal using a first filter for droop compensation with fixed filter coefficients or a second filter for droop compensation with filter coefficients based on the carrier frequency shift, the first filter having a bandwidth including a carrier bandwidth and a limited carrier frequency offset for filtering the first signal before signal rotation, the second filter having a bandwidth that is based on a carrier bandwidth and the carrier frequency shift for filtering the first signal after signal rotation. The communications manager 720 is capable of, configured to, or operable to support a means for demodulating the first signal that is filtered using the first filter or the second filter.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for reduced processing, reduced power consumption, more efficient utilization of communication resources, or improved signal reception quality.

Figure 8:
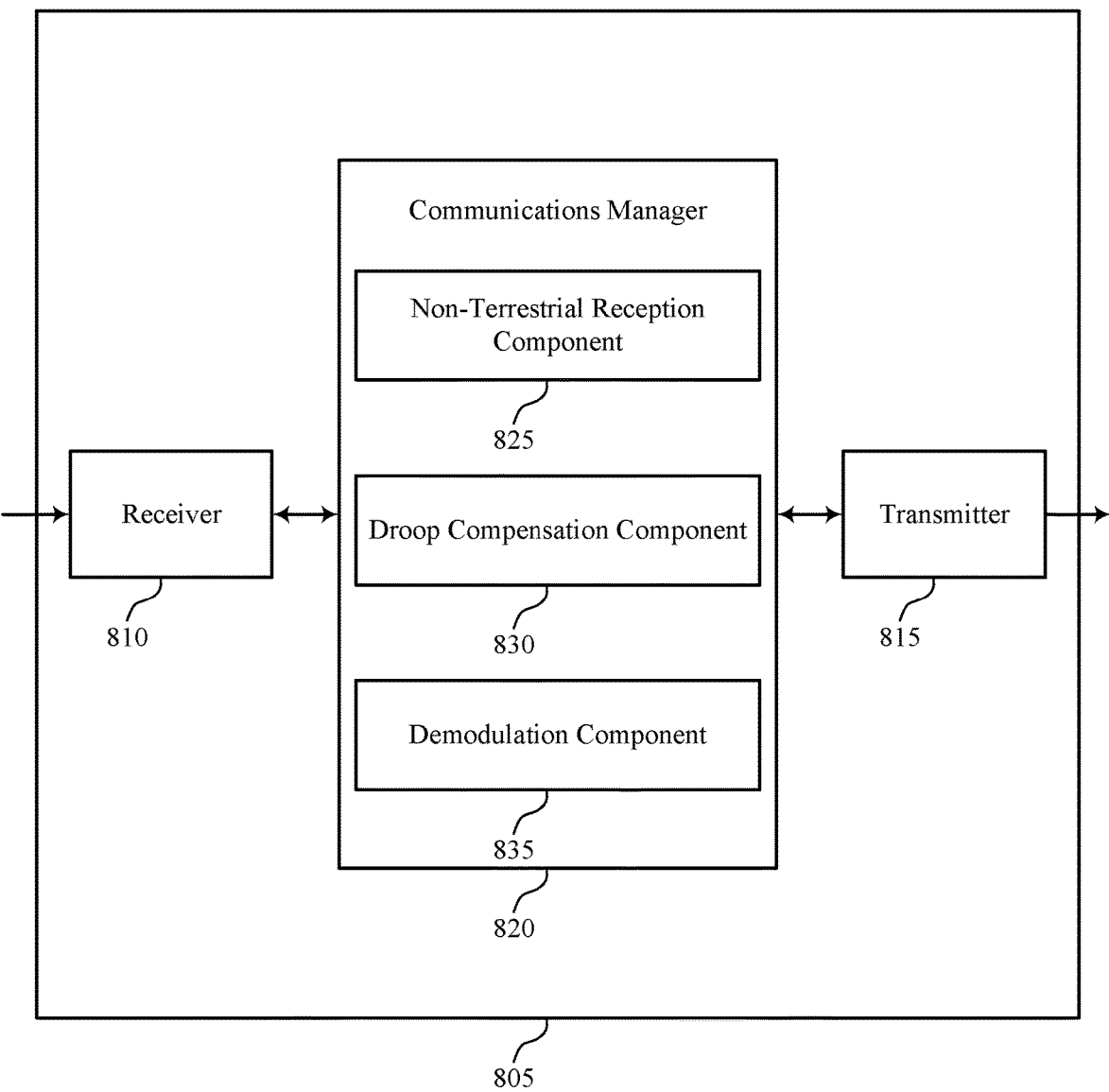

FIG. 8 shows a block diagram 800 of a device 805 that supports receivers for NTNs in accordance with one or more aspects of the present disclosure. The device 805 may be an example of aspects of a device 705 or a UE 115 as described herein. The device 805 may include a receiver 810, a transmitter 815, and a communications manager 820. The device 805, or one or more components of the device 805 (e.g., the receiver 810, the transmitter 815, the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to receivers for NTNs). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to receivers for NTNs). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of receivers for NTNs as described herein. For example, the communications manager 820 may include a non-terrestrial reception component 825, a droop compensation component 830, a demodulation component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. The non-terrestrial reception component 825 is capable of, configured to, or operable to support a means for receiving a first signal from a NTN node, the first signal associated with a carrier frequency shift from relative motion between the UE and the NTN node. The droop compensation component 830 is capable of, configured to, or operable to support a means for filtering the first signal using a first filter for droop compensation with fixed filter coefficients or a second filter for droop compensation with filter coefficients based on the carrier frequency shift, the first filter having a bandwidth including a carrier bandwidth and a limited carrier frequency offset for filtering the first signal before signal rotation, the second filter having a bandwidth that is based on a carrier bandwidth and the carrier frequency shift for filtering the first signal after signal rotation. The demodulation component 835 is capable of, configured to, or operable to support a means for demodulating the first signal that is filtered using the first filter or the second filter.

Figure 9:
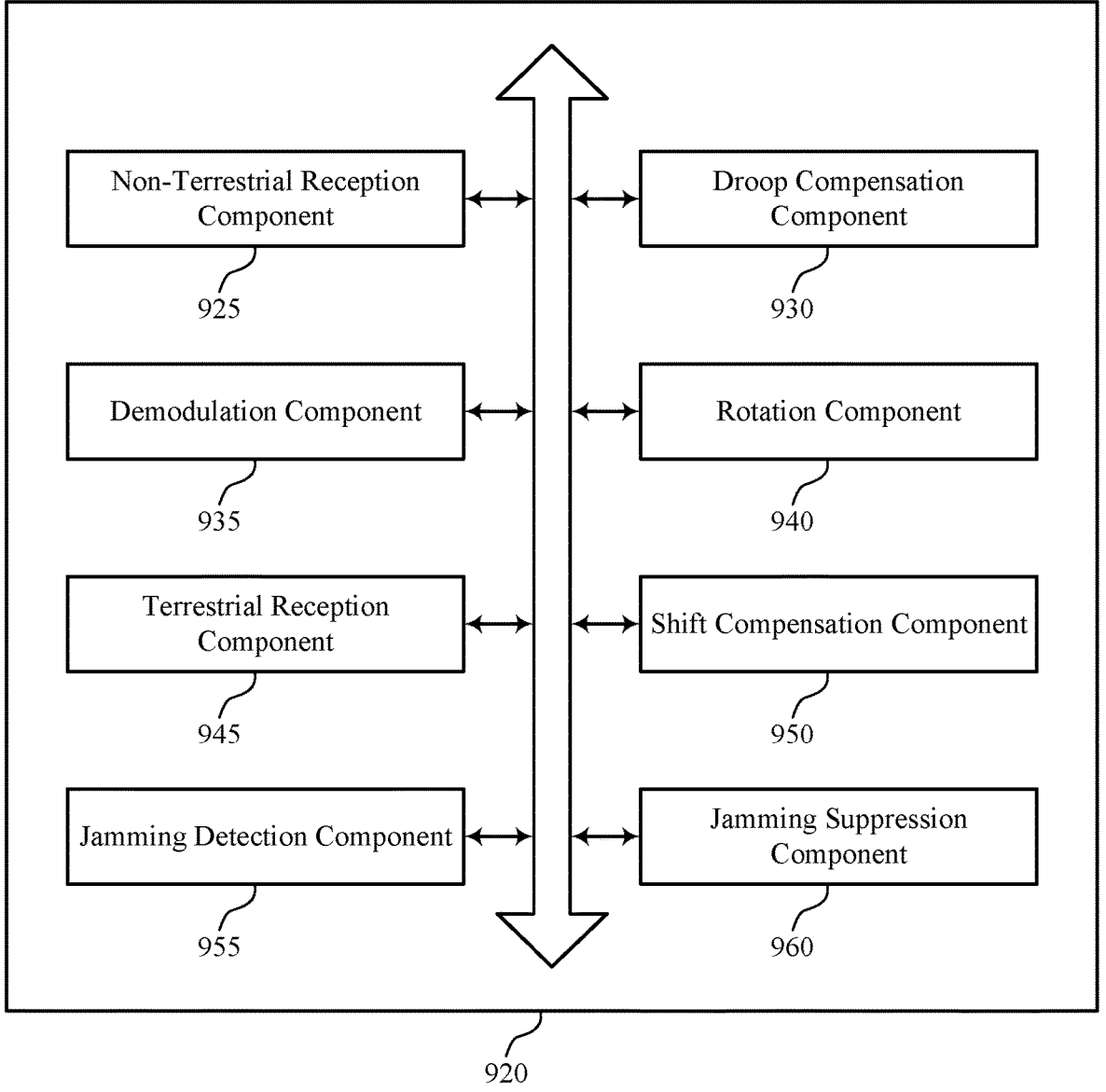
FIG. 9 shows a block diagram of a communications manager that supports receivers for NTNs in accordance with one or more aspects of the present disclosure.

FIG. 9 shows a block diagram 900 of a communications manager 920 that supports receivers for NTNs in accordance with one or more aspects of the present disclosure. The communications manager 920 may be an example of aspects of a communications manager 720, a communications manager 820, or both, as described herein. The communications manager 920, or various components thereof, may be an example of means for performing various aspects of receivers for NTNs as described herein. For example, the communications manager 920 may include a non-terrestrial reception component 925, a droop compensation component 930, a demodulation component 935, a rotation component 940, a terrestrial reception component 945, a shift compensation component 950, a jamming detection component 955, a jamming suppression component 960, or any combination thereof. Each of these components, or components or subcomponents thereof (e.g., one or more processors, one or more memories), may communicate, directly or indirectly, with one another (e.g., via one or more buses).

The communications manager 920 may support wireless communications in accordance with examples as disclosed herein. The non-terrestrial reception component 925 is capable of, configured to, or operable to support a means for receiving a first signal from a NTN node, the first signal associated with a carrier frequency shift from relative motion between the UE and the NTN node. The droop compensation component 930 is capable of, configured to, or operable to support a means for filtering the first signal using a first filter for droop compensation with fixed filter coefficients or a second filter for droop compensation with filter coefficients based on the carrier frequency shift, the first filter having a bandwidth including a carrier bandwidth and a limited carrier frequency offset for filtering the first signal before signal rotation, the second filter having a bandwidth that is based on a carrier bandwidth and the carrier frequency shift for filtering the first signal after signal rotation. The demodulation component 935 is capable of, configured to, or operable to support a means for demodulating the first signal that is filtered using the first filter or the second filter.

In some examples, the rotation component 940 is capable of, configured to, or operable to support a means for compensating for the carrier frequency shift via a rotator, where the second filter is determined based on the carrier frequency shift compensated via the rotator.

In some examples, the second filter is determined in response to the carrier frequency shift being within a frequency range or is determined in response to the carrier frequency shift differing by a threshold quantity from a previous carrier frequency shift.

In some examples, the terrestrial reception component 945 is capable of, configured to, or operable to support a means for receiving a second signal from a TN node, the second signal at least partially overlapping in a frequency band with the first signal. In some examples, the droop compensation component 930 is capable of, configured to, or operable to support a means for filtering the second signal using a third filter for droop compensation after signal rotation, the third filter having a bandwidth that is less than the bandwidth of the first filter.

In some examples, the first signal is filtered using the first filter, and the droop compensation component 930 is capable of, configured to, or operable to support a means for filtering the first signal using a third filter for droop compensation after signal rotation and decimation, the third filter having fixed coefficients based on a frequency response of a decimator for performing the decimation.

In some examples, filtering the first signal using the third filter includes filtering the first signal in a frequency domain after a frequency domain transformation or includes time domain filtering the first signal.

In some examples, the first signal is received during an initial acquisition period before determining the carrier frequency shift, and the non-terrestrial reception component 925 is capable of, configured to, or operable to support a means for receiving a second signal from the NTN node. In some examples, the first signal is received during an initial acquisition period before determining the carrier frequency shift, and the shift compensation component 950 is capable of, configured to, or operable to support a means for compensating for the carrier frequency shift in the second signal using a local oscillator after the initial acquisition period based on determining the carrier frequency shift.

In some examples, the non-terrestrial reception component 925 is capable of, configured to, or operable to support a means for receiving a second signal from the NTN node, the second signal associated with a second carrier frequency shift. In some examples, the jamming detection component 955 is capable of, configured to, or operable to support a means for detecting a jamming signal from a TN node, where the second carrier frequency shift reduces a frequency domain spacing between the first signal and the jamming signal. In some examples, the jamming suppression component 960 is capable of, configured to, or operable to support a means for filtering the second signal using a third filter for suppressing the jamming signal, the third filter having a steeper frequency response than the first filter or the second filter between the second signal and the jamming signal for the reduced frequency domain spacing.

In some examples, the non-terrestrial reception component 925 is capable of, configured to, or operable to support a means for receiving a second signal from the NTN node, the second signal associated with a second carrier frequency shift. In some examples, the jamming detection component 955 is capable of, configured to, or operable to support a means for detecting a jamming signal from a TN node, where the second carrier frequency shift causes a reduced frequency domain spacing between the first signal and the jamming signal. In some examples, the droop compensation component 930 is capable of, configured to, or operable to support a means for filtering the second signal using the first filter or the second filter, where the first filter or the second filter provides reduced jamming performance relative to a signal without the reduced frequency domain spacing.

Figure 10:
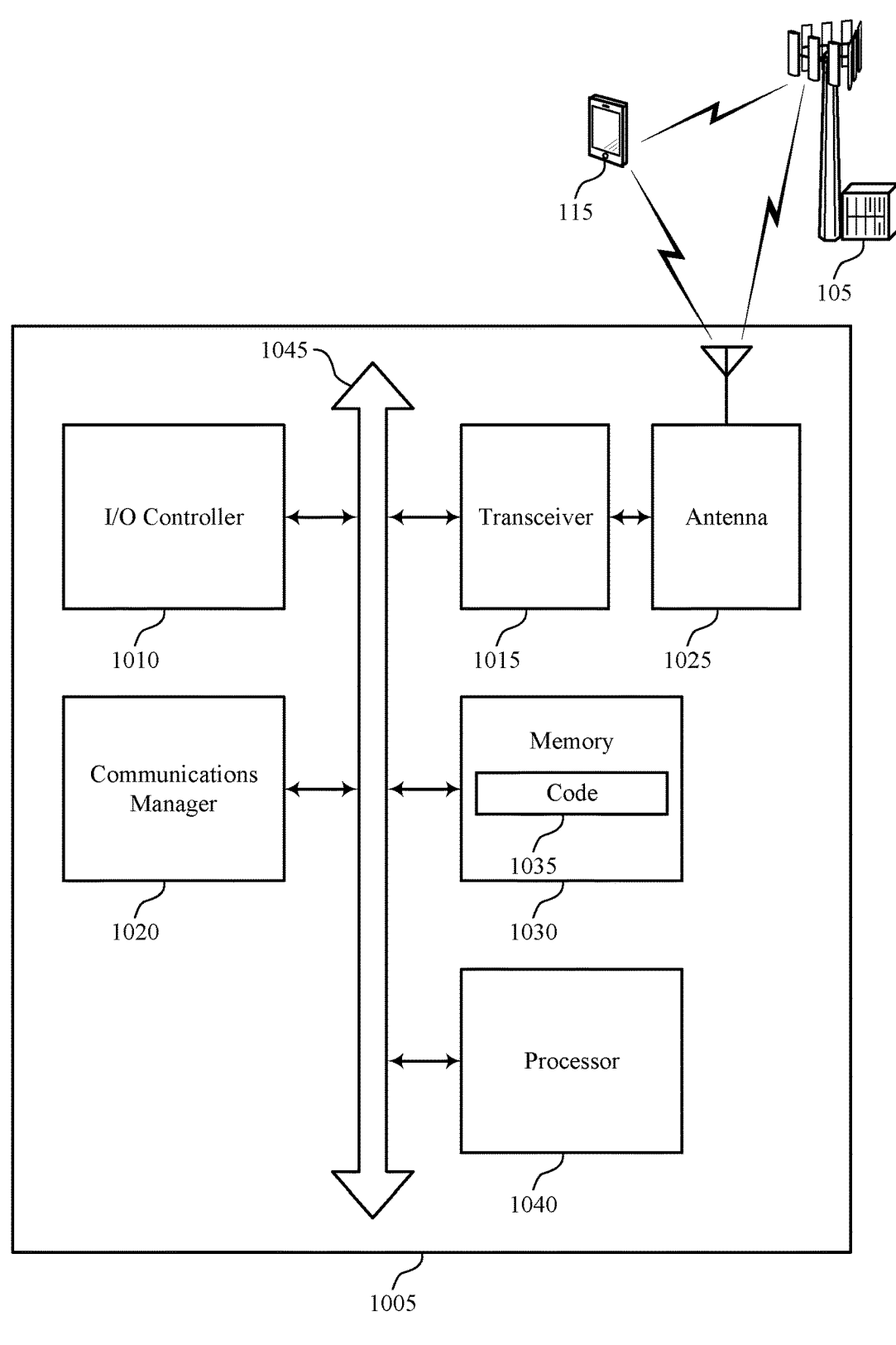
FIG. 10 shows a diagram of a system including a device that supports receivers for NTNs in accordance with one or more aspects of the present disclosure.

FIG. 10 shows a diagram of a system 1000 including a device 1005 that supports receivers for NTNs in accordance with one or more aspects of the present disclosure. The device 1005 may be an example of or include components of a device 705, a device 805, or a UE 115 as described herein. The device 1005 may communicate (e.g., wirelessly) with one or more other devices (e.g., network entities 105, UEs 115, or a combination thereof). The device 1005 may include components for bi-directional voice and data communications including components for transmitting and receiving communications, such as a communications manager 1020, an input/output (I/O) controller, such as an I/O controller 1010, a transceiver 1015, one or more antennas 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna. However, in some other cases, the device 1005 may have more than one antenna, which may be capable of concurrently transmitting or receiving multiple wireless transmissions. The transceiver 1015 may communicate bi-directionally via the one or more antennas 1025 using wired or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable, or processor-executable code, such as the code 1035. The code 1035 may include instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may include, among other things, a basic I/O system (BIOS) which may control basic hardware or software operation such as the interaction with peripheral components or devices.

The at least one processor 1040 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting receivers for NTNs). For example, the device 1005 or a component of the device 1005 may include at least one processor 1040 and at least one memory 1030 coupled with or to the at least one processor 1040, the at least one processor 1040 and the at least one memory 1030 configured to perform various functions described herein.

In some examples, the at least one processor 1040 may include multiple processors and the at least one memory 1030 may include multiple memories. One or more of the multiple processors may be coupled with one or more of the multiple memories, which may, individually or collectively, be configured to perform various functions described herein. In some examples, the at least one processor 1040 may be a component of a processing system, which may refer to a system (such as a series) of machines, circuitry (including, for example, one or both of processor circuitry (which may include the at least one processor 1040) and memory circuitry (which may include the at least one memory 1030)), or components, that receives or obtains inputs and processes the inputs to produce, generate, or obtain a set of outputs. The processing system may be configured to perform one or more of the functions described herein. For example, the at least one processor 1040 or a processing system including the at least one processor 1040 may be configured to, configurable to, or operable to cause the device 1005 to perform one or more of the functions described herein. Further, as described herein, being "configured to," being "configurable to," and being "operable to" may be used interchangeably and may be associated with a capability, when executing code 1035 (e.g., processor-executable code) stored in the at least one memory 1030 or otherwise, to perform one or more of the functions described herein.

The communications manager 1020 may support wireless communications in accordance with examples as disclosed herein. For example, the communications manager 1020 is capable of, configured to, or operable to support a means for receiving a first signal from a NTN node, the first signal associated with a carrier frequency shift from relative motion between the UE and the NTN node. The communications manager 1020 is capable of, configured to, or operable to support a means for filtering the first signal using a first filter for droop compensation with fixed filter coefficients or a second filter for droop compensation with filter coefficients based on the carrier frequency shift, the first filter having a bandwidth including a carrier bandwidth and a limited carrier frequency offset for filtering the first signal before signal rotation, the second filter having a bandwidth that is based on a carrier bandwidth and the carrier frequency shift for filtering the first signal after signal rotation. The communications manager 1020 is capable of, configured to, or operable to support a means for demodulating the first signal that is filtered using the first filter or the second filter.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, improved utilization of processing capability, or improved reception accuracy.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of receivers for NTNs as described herein, or the at least one processor 1040 and the at least one memory 1030 may be otherwise configured to, individually or collectively, perform or support such operations.

FIG. 11 shows a flowchart illustrating a method 1100 that supports receivers for NTNs in accordance with one or more aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1105, the method may include receiving a first signal from a NTN node, the first signal associated with a carrier frequency shift from relative motion between the UE and the NTN node. The operations of 1105 may be performed in accordance with examples as disclosed herein. In some examples, aspects of the operations of 1105 may be performed by a non-terrestrial reception component 925 as described with reference to FIG. 9.

At 1110, the method may include filtering the first signal using a first filter for droop compensation with fixed filter coefficients or a second filter for droop compensation with filter coefficients based on the carrier frequency shift, the first filter having a bandwidth including a carrier bandwidth and a limited carrier frequency offset for filtering the first signal before signal rotation, the second filter having a bandwidth that is based on a carrier bandwidth and the carrier frequency shift for filtering the first signal after signal rotation. The operations of 1110 may be performed in accordance with examples as disclosed herein. In some examples, aspects of the operations of 1110 may be performed by a droop compensation component 930 as described with reference to FIG. 9.

At 1115, the method may include demodulating the first signal that is filtered using the first filter or the second filter. The operations of 1115 may be performed in accordance with examples as disclosed herein. In some examples, aspects of the operations of 1115 may be performed by a demodulation component 935 as described with reference to FIG. 9.

FIG. 12 shows a flowchart illustrating a method 1200 that supports receivers for NTNs in accordance with one or more aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1205, the method may include receiving a first signal from a NTN node, the first signal associated with a carrier frequency shift from relative motion between the UE and the NTN node. The operations of 1205 may be performed in accordance with examples as disclosed herein. In some examples, aspects of the operations of 1205 may be performed by a non-terrestrial reception component 925 as described with reference to FIG. 9.

At 1210, the method may include filtering the first signal using a first filter for droop compensation with fixed filter coefficients or a second filter for droop compensation with filter coefficients based on the carrier frequency shift, the first filter having a bandwidth including a carrier bandwidth and a limited carrier frequency offset for filtering the first signal before signal rotation, the second filter having a bandwidth that is based on a carrier bandwidth and the carrier frequency shift for filtering the first signal after signal rotation. The operations of 1210 may be performed in accordance with examples as disclosed herein. In some examples, aspects of the operations of 1210 may be performed by a droop compensation component 930 as described with reference to FIG. 9.

At 1215, the method may include demodulating the first signal that is filtered using the first filter or the second filter. The operations of 1215 may be performed in accordance with examples as disclosed herein. In some examples, aspects of the operations of 1215 may be performed by a demodulation component 935 as described with reference to FIG. 9.

At 1220, the method may include receiving a second signal from a TN node, the second signal at least partially overlapping in a frequency band with the first signal. The operations of 1220 may be performed in accordance with examples as disclosed herein. In some examples, aspects of the operations of 1220 may be performed by a terrestrial reception component 945 as described with reference to FIG. 9.

At 1225, the method may include filtering the second signal using a third filter for droop compensation after signal rotation, the third filter having a bandwidth that is less than the bandwidth of the first filter. The operations of 1225 may be performed in accordance with examples as disclosed herein. In some examples, aspects of the operations of 1225 may be performed by a droop compensation component 930 as described with reference to FIG. 9.

The following provides an overview of aspects of the present disclosure:

Aspect 1: A method for wireless communications by a UE, comprising: receiving a first signal from a NTN node, the first signal associated with a carrier frequency shift from relative motion between the UE and the NTN node; filtering the first signal using a first filter for droop compensation with fixed filter coefficients or a second filter for droop compensation with filter coefficients based at least in part on the carrier frequency shift, the first filter having a bandwidth including a carrier bandwidth and a limited carrier frequency offset for filtering the first signal before signal rotation, the second filter having a bandwidth that is based at least in part on a carrier bandwidth and the carrier frequency shift for filtering the first signal after signal rotation; and demodulating the first signal that is filtered using the first filter or the second filter.

Aspect 2: The method of aspect 1, further comprising: compensating for the carrier frequency shift via a rotator, wherein the second filter is determined based at least in part on the carrier frequency shift compensated via the rotator.

Aspect 3: The method of aspect 2, wherein the second filter is determined in response to the carrier frequency shift being within a frequency range or is determined in response to the carrier frequency shift differing by a threshold quantity from a previous carrier frequency shift.

Aspect 4: The method of any of aspects 1 through 3, further comprising: receiving a second signal from a TN node, the second signal at least partially overlapping in a frequency band with the first signal; and filtering the second signal using a third filter for droop compensation after signal rotation, the third filter having a bandwidth that is less than the bandwidth of the first filter.

Aspect 5: The method of any of aspects 1 through 4, wherein the first signal is filtered using the first filter, the method further comprising: filtering the first signal using a third filter for droop compensation after signal rotation and decimation, the third filter having fixed coefficients based at least in part on a frequency response of a decimator for performing the decimation.

Aspect 6: The method of aspect 5, wherein filtering the first signal using the third filter comprises filtering the first signal in a frequency domain after a frequency domain transformation or comprises time domain filtering the first signal.

Aspect 7: The method of any of aspects 1 through 6, wherein the first signal is received during an initial acquisition period before determining the carrier frequency shift, and wherein filtering the first signal is performed using the first filter, the method further comprising: receiving a second signal from the NTN node; and compensating for the carrier frequency shift in the second signal using a local oscillator after the initial acquisition period based at least in part on determining the carrier frequency shift.

Aspect 8: The method of any of aspects 1 through 7, further comprising: receiving a second signal from the NTN node, the second signal associated with a second carrier frequency shift; detecting a jamming signal from a TN node, wherein the second carrier frequency shift reduces a frequency domain spacing between the first signal and the jamming signal; and filtering the second signal using a third filter for suppressing the jamming signal, the third filter having a steeper frequency response than the first filter or the second filter between the second signal and the jamming signal for the reduced frequency domain spacing.

Aspect 9: The method of any of aspects 1 through 7, further comprising: receiving a second signal from the NTN node, the second signal associated with a second carrier frequency shift; detecting a jamming signal from a TN node, wherein the second carrier frequency shift causes a reduced frequency domain spacing between the first signal and the jamming signal; and filtering the second signal using the first filter or the second filter, wherein the first filter or the second filter provides reduced jamming performance relative to a signal without the reduced frequency domain spacing.

Aspect 10: A UE for wireless communications, comprising one or more memories storing processor-executable code, and one or more processors coupled with the one or more memories and individually or collectively operable to execute the code to cause the UE to perform a method of any of aspects 1 through 9.

Aspect 11: A UE for wireless communications, comprising at least one means for performing a method of any of aspects 1 through 9.

Aspect 12: A non-transitory computer-readable medium storing code for wireless communications, the code comprising instructions executable by one or more processors to perform a method of any of aspects 1 through 9.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive a first signal from a non-terrestrial network node, the first signal associated with a carrier frequency shift from relative motion between the UE and the non-terrestrial network node;

filter the first signal using a first filter for droop compensation with fixed filter coefficients or a second filter for droop compensation with filter coefficients based at least in part on the carrier frequency shift, the first filter having a bandwidth including a carrier bandwidth and a limited carrier frequency offset for filtering the first signal before signal rotation, the second filter having a bandwidth that is based at least in part on a carrier bandwidth and the carrier frequency shift for filtering the first signal after signal rotation; and demodulate the first signal that is filtered using the first filter or the second filter.

2. The UE of claim 1, wherein the one or more processors are individually or collectively further operable to execute the code to cause the UE to:

compensate for the carrier frequency shift via a rotator, wherein the second filter is determined based at least in part on the carrier frequency shift compensated via the rotator.

3. The UE of claim 2, wherein the second filter is determined in response to the carrier frequency shift being within a frequency range or is determined in response to the carrier frequency shift differing by a threshold quantity from a previous carrier frequency shift.

4. The UE of claim 1, wherein the one or more processors are individually or collectively further operable to execute the code to cause the UE to:

receive a second signal from a terrestrial network node, the second signal at least partially overlapping in a frequency band with the first signal; and filter the second signal using a third filter for droop compensation after signal rotation, the third filter having a bandwidth that is less than the bandwidth of the first filter.

5. The UE of claim 1, wherein the first signal is filtered using the first filter, and the one or more processors are individually or collectively further operable to execute the code to cause the UE to:

filter the first signal using a third filter for droop compensation after signal rotation and decimation, the third filter having fixed coefficients based at least in part on a frequency response of a decimator for performing the decimation.

6. The UE of claim 5, wherein filtering the first signal using the third filter comprises filtering the first signal in a frequency domain after a frequency domain transformation or comprises time domain filtering the first signal.

7. The UE of claim 1, wherein the first signal is received during an initial acquisition period before determining the carrier frequency shift, and the one or more processors are individually or collectively further operable to execute the code to cause the UE to:

receive a second signal from the non-terrestrial network node; and compensate for the carrier frequency shift in the second signal using a local oscillator after the initial acquisition period based at least in part on determining the carrier frequency shift.

8. The UE of claim 1, wherein the one or more processors are individually or collectively further operable to execute the code to cause the UE to:

receive a second signal from the non-terrestrial network node, the second signal associated with a second carrier frequency shift;

detect a jamming signal from a terrestrial network node, wherein the second carrier frequency shift reduces a frequency domain spacing between the first signal and the jamming signal; and filter the second signal using a third filter for suppressing the jamming signal, the third filter having a steeper frequency response than the first filter or the second filter between the second signal and the jamming signal for the reduced frequency domain spacing.

9. The UE of claim 1, wherein the one or more processors are individually or collectively further operable to execute the code to cause the UE to:

receive a second signal from the non-terrestrial network node, the second signal associated with a second carrier frequency shift;

detect a jamming signal from a terrestrial network node, wherein the second carrier frequency shift causes a reduced frequency domain spacing between the first signal and the jamming signal; and filter the second signal using the first filter or the second filter, wherein the first filter or the second filter provides reduced jamming performance relative to a signal without the reduced frequency domain spacing.

10. A method for wireless communications by a user equipment (UE), comprising:

receiving a first signal from a non-terrestrial network node, the first signal associated with a carrier frequency shift from relative motion between the UE and the non-terrestrial network node;

filtering the first signal using a first filter for droop compensation with fixed filter coefficients or a second filter for droop compensation with filter coefficients based at least in part on the carrier frequency shift, the first filter having a bandwidth including a carrier bandwidth and a limited carrier frequency offset for filtering the first signal before signal rotation, the second filter having a bandwidth that is based at least in part on a carrier bandwidth and the carrier frequency shift for filtering the first signal after signal rotation; and demodulating the first signal that is filtered using the first filter or the second filter.

11. The method of claim 10, further comprising:

compensating for the carrier frequency shift via a rotator, wherein the second filter is determined based at least in part on the carrier frequency shift compensated via the rotator.

12. The method of claim 11, wherein the second filter is determined in response to the carrier frequency shift being within a frequency range or is determined in response to the carrier frequency shift differing by a threshold quantity from a previous carrier frequency shift.

13. The method of claim 10, further comprising:

receiving a second signal from a terrestrial network node, the second signal at least partially overlapping in a frequency band with the first signal; and filtering the second signal using a third filter for droop compensation after signal rotation, the third filter having a bandwidth that is less than the bandwidth of the first filter.

14. The method of claim 10, wherein the first signal is filtered using the first filter, the method further comprising:

filtering the first signal using a third filter for droop compensation after signal rotation and decimation, the third filter having fixed coefficients based at least in part on a frequency response of a decimator for performing the decimation.

15. The method of claim 14, wherein filtering the first signal using the third filter comprises filtering the first signal in a frequency domain after a frequency domain transformation or comprises time domain filtering the first signal.

16. The method of claim 10, wherein the first signal is received during an initial acquisition period before determining the carrier frequency shift, and wherein filtering the first signal is performed using the first filter, the method further comprising:

receiving a second signal from the non-terrestrial network node; and compensating for the carrier frequency shift in the second signal using a local oscillator after the initial acquisition period based at least in part on determining the carrier frequency shift.

17. The method of claim 10, further comprising:

receiving a second signal from the non-terrestrial network node, the second signal associated with a second carrier frequency shift;

detecting a jamming signal from a terrestrial network node, wherein the second carrier frequency shift reduces a frequency domain spacing between the first signal and the jamming signal; and filtering the second signal using a third filter for suppressing the jamming signal, the third filter having a steeper frequency response than the first filter or the second filter between the second signal and the jamming signal for the reduced frequency domain spacing.

18. The method of claim 10, further comprising:

receiving a second signal from the non-terrestrial network node, the second signal associated with a second carrier frequency shift;

detecting a jamming signal from a terrestrial network node, wherein the second carrier frequency shift causes a reduced frequency domain spacing between the first signal and the jamming signal; and filtering the second signal using the first filter or the second filter, wherein the first filter or the second filter provides reduced jamming performance relative to a signal without the reduced frequency domain spacing.

19. A non-transitory computer-readable medium storing code for wireless communications, the code comprising instructions executable by one or more processors to:

receive a first signal from a non-terrestrial network node, the first signal associated with a carrier frequency shift from relative motion between a user equipment (UE) and the non-terrestrial network node;

filter the first signal using a first filter for droop compensation with fixed filter coefficients or a second filter for droop compensation with filter coefficients based at least in part on the carrier frequency shift, the first filter having a bandwidth including a carrier bandwidth and a limited carrier frequency offset for filtering the first signal before signal rotation, the second filter having a bandwidth that is based at least in part on a carrier bandwidth and the carrier frequency shift for filtering the first signal after signal rotation; and demodulate the first signal that is filtered using the first filter or the second filter.

20. The non-transitory computer-readable medium of claim 19, wherein the instructions are further executable by the one or more processors to:

compensate for the carrier frequency shift via a rotator, wherein the second filter is determined based at least in part on the carrier frequency shift compensated via the rotator.

* * * * *